United States Patent
Chiu

(10) Patent No.: US 9,763,058 B2
(45) Date of Patent: Sep. 12, 2017

(54) METHOD AND SYSTEM OF PERSONALIZED BROADCAST SERVICE ON PUBLIC TRANSPORTATION

(71) Applicant: CHERRY SOUND LIMITED, Hong Kong (CN)

(72) Inventor: Jason Felix Tsz-Kiu Chiu, Hong Kong (CN)

(73) Assignee: CHERRY SOUND LIMITED, Hong Kong (CN)

( * ) Notice: Subject to any disclaimer, the term of this patent is extended or adjusted under 35 U.S.C. 154(b) by 49 days.

(21) Appl. No.: 14/290,732

(22) Filed: May 29, 2014

(65) Prior Publication Data
US 2014/0357261 A1    Dec. 4, 2014

(30) Foreign Application Priority Data
May 29, 2013    (CN) .......................... 2013 1 0206579

(51) Int. Cl.
*H04W 4/04* (2009.01)
*H04W 4/02* (2009.01)
(Continued)

(52) U.S. Cl.
CPC .......... *H04W 4/046* (2013.01); *H04W 4/027* (2013.01); *H04W 4/028* (2013.01); *H04W 4/06* (2013.01); *H04W 4/20* (2013.01)

(58) Field of Classification Search
CPC ....... H04W 4/02; H04W 4/021; H04W 4/022; H04W 4/023; H04W 4/025; H04W 4/026;
(Continued)

(56) References Cited

U.S. PATENT DOCUMENTS 6,584,138 B1 *    6/2003    Neubauer .............. H04H 20/31
                                                                        375/130
7,406,467 B1 *    7/2008    White ............... G06F 17/30522
                                                                        705/5
(Continued)

FOREIGN PATENT DOCUMENTS

CN            101374177 A        2/2009
CN            101520330 A        9/2009
(Continued)

*Primary Examiner* — Rafael Pérez-Gutiérrez
*Assistant Examiner* — Martin Chang
(74) *Attorney, Agent, or Firm* — Bowen Liu; David Lewis

(57) ABSTRACT

A method for implementing broadcast service and a broadcast service system are provided. The information transmitted may be personalized for a user of a public transportation system. In an embodiment, the method includes transmitting information including at least a calling point identifier. Optionally the information may be transmitted via audio signals. Optionally the information is encrypted during transmission and decrypted upon receipt. Information related to the calling point may be retrieved based on the calling point identifier. The information may be displayed selectively. In an embodiment, position and speed information of the user may be obtained, and the time of arrival at a calling point may be determined. In an embodiment, the broadcast system may alert the user upon arrival at a calling point or in advance.

52 Claims, 15 Drawing Sheets

(51) Int. Cl.
*H04W 4/06* (2009.01)
*H04W 4/20* (2009.01)

(58) Field of Classification Search
CPC ....... H04W 4/027; H04W 4/028; H04W 4/04; H04W 4/046; G08G 1/09626
USPC ................................ 455/426.1, 552.1, 575.9
See application file for complete search history.

(56) References Cited

U.S. PATENT DOCUMENTS

| | | | | |
|---|---|---|---|---|
| 7,706,970 B2* | 4/2010 | Inoue | ...................... | H04L 67/36 209/200 |
| 7,797,204 B2* | 9/2010 | Balent | .................. | G06Q 10/087 705/26.8 |
| 8,432,256 B2* | 4/2013 | Oki | ....................... | G06Q 10/02 340/10.1 |
| 2002/0049054 A1* | 4/2002 | O'Connor | ............... | G08G 1/123 455/426.1 |
| 2002/0094829 A1* | 7/2002 | Ritter | ..................... | H04H 20/62 455/517 |
| 2003/0143944 A1* | 7/2003 | Martin | .................... | G09F 27/00 455/3.01 |
| 2005/0043043 A1* | 2/2005 | Winn | ...................... | H04L 29/06 455/456.5 |
| 2009/0216443 A1 | 8/2009 | Shi | | |
| 2010/0076826 A1* | 3/2010 | Bayne | ................ | G06Q 30/0229 705/14.3 |
| 2011/0050463 A1 | 3/2011 | Yu et al. | | |
| 2011/0055005 A1* | 3/2011 | Lang | ....................... | G06Q 30/02 705/14.45 |
| 2011/0159892 A1* | 6/2011 | Kim | ........................ | H04W 4/02 455/456.3 |
| 2012/0054028 A1* | 3/2012 | Tengler | .............. | G01C 21/3697 705/14.49 |
| 2013/0156190 A1* | 6/2013 | Selen | ...................... | H04W 4/02 380/270 |
| 2014/0171013 A1* | 6/2014 | Varoglu | .................. | H04W 4/22 455/404.2 |
| 2014/0379259 A1* | 12/2014 | Sinha | ..................... | G06Q 50/01 701/537 |

FOREIGN PATENT DOCUMENTS

| | | |
|---|---|---|
| CN | 101799989 A | 8/2010 |
| CN | 101847325 A | 9/2010 |
| CN | 102275600 A | 12/2011 |
| CN | 102280041 A | 12/2011 |
| CN | 102595356 A | 7/2012 |
| CN | 102598082 A | 7/2012 |
| CN | 202472959 U | 10/2012 |
| CN | 102857847 A | 1/2013 |
| CN | 103067581 A | 4/2013 |
| CN | 202976503 U | 6/2013 |
| JP | 2002-204467 A | 7/2002 |
| WO | WO 02/48987 A1 | 6/2002 |
| WO | WO 2011057797 * | 5/2011 ............. H04W 4/06 |

* cited by examiner

METHOD AND SYSTEM OF PERSONALIZED BROADCAST SERVICE ON PUBLIC TRANSPORTATION

CROSS-REFERENCE TO RELATED APPLICATIONS

This application claims priority benefit of Chinese Patent Application Number CN 201310206579.2, entitled "METHOD AND SYSTEM OF PERSONALIZED BROADCAST SERVICE ON PUBLIC TRANSPORTATION," filed on May 29 2013, by Jason Felix Chiu Tsz Kiu, which is incorporated herein by reference.

FIELD

The present specification relates to a broadcast service.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

With the advancement of mobile communications, a user can obtain information about the present position using a mobile device, and hence can access information related to nearby buildings and public transportation. Normally, mobile device obtains position information via Global Position System (GPS) and Assisted Global Positioning System (AGPS). Current technology also allows a mobile device to obtain position information via base stations of mobile networks and other means. Short Message Service (SMS) for commercials can be broadcasted to all mobile devices connected to the same base station. However, in this case, mobile device do not have the capability to selectively receive information that interests the user of the mobile device.

Currently on a public transportation vehicle, or a public transit, such as a high speed train traveling from New York City to Washington, D.C., or a ferry from Seattle, USA to Victoria of Vancouver Island, Canada, or a train from New York City to Boston, passengers are interested in weather, transportation and travel information about the destination of the trip instead of the present position of the public transit. When the public transit has just left the departure point, or is still far away from the destination of the trip, the mobile device of a passenger is not able to automatically obtain position information about the destination, thus cannot provide accurate and useful information about the destination that interests the passenger.

Furthermore, accurate positioning is important in the prediction of next stop of public transportation during travelling. When a bus or train is traveling underground or along a street of high rise buildings, current technology is not able to provide accurate position information when travelling on the public transit. In this case, mobile device cannot predict or determine the location and other information about next stop or destination based on present position of the public transit. For example, when a train has departed the first station and is en route to the second station, the mobile device of a passenger on the train may still show a position at the first station or 30 meters east of the first station, but is not able to predict or provide position information of next stop. In another example, when a subway is traveling underground, a mobile device may not be able to receive any satellite signal. In this situation, the mobile device may obtain position information, via mobile communication network from a base station, which may be 2000 meters away from the departure station and cannot provide accurate position information for the mobile device to predict or determine the position of next stop of the subway.

Currently, a public transit can broadcast information about next stop or station during the trip, optionally via audio broadcasting by a public address system, and/or scrolling text or cycling video displayed on screens installed on the public transit. However, such broadcast may not catch the attention of an individual passenger who needs the broadcasted information. In addition, too much information flooding the screens and too many audio messages from speakers may annoy the passengers instead of catching enough attention or conveying information.

As can be seen from the above, the current techniques have inconveniencies and deficiencies in practical applications, and it may be desirable to make an improvement.

SUMMARY

In view of the above deficiencies, in an embodiment a method and a system are provided for realizing personalized broadcast service on public transportation. The personalized broadcast service system broadcasts to passengers useful and accurate information related to the public transportation vehicle and/or calling points en route when passengers are travelling via public transportation. In at least one embodiment, the broadcasting is enhanced and personalized to meet requirements of each individual passenger.

In at least one embodiment, the broadcast service system includes at least a broadcast terminal installed on a public transportation vehicle, which broadcasts to at least one mobile terminal of passengers on the public transportation vehicle during traveling. In at least one embodiment, the broadcast terminal sends messages, and optionally via audio signals, to the mobile terminal. The message sent includes at least one identifier of a calling point en route by the public transportation vehicle during the trip. In at least one embodiment, the message sent by the broadcast terminal is encrypted and/or enhanced. For example, the signal sent by the broadcast terminal may be amplified (e.g., the strength and amplitude may be amplified). The mobile terminal receives and/or decodes the message including the identifier of the calling point, and performs a query and obtains information related to the calling point from a server. The information received from the server may include static, dynamic, and/or commercial information about the calling point, which may be displayed on the mobile terminal. In at least one embodiment, the mobile terminal also obtains route information including schedules of the public transportation and other information from the server.

At least one embodiment of the broadcast service system provides useful and accurate position information regarding the public transportation vehicle and/or a calling point to the passenger during a trip. In at least one embodiment, the broadcast service system may accurately predict the next calling point, time of arrival at and/or time required to travel to a calling point, and provide alert services. In at least one embodiment, mobile terminal can alert the passenger when the public transportation vehicle arrives at a calling point, or in advance of arrival, so that the passenger will not miss the calling point to get off the public transportation vehicle. At least one embodiment of the broadcast service system provides plentiful and various other information to fulfill requirements of individual passengers. In at least one embodiment, the mobile terminal displays headings of information related to a calling point, and the passenger, upon viewing the headings, selects from the headings to view further details of the information on the mobile terminal. In at least one embodiment, the broadcast service system provides the passenger with options to selectively receive and/or view certain information and thus enhance user experience.

Any of the above embodiments may be used alone or together with one another in any combination. Inventions encompassed within this specification may also include embodiments that are only partially mentioned or alluded to or are not mentioned or alluded to at all in this brief summary or in the abstract.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION

Figure 1:
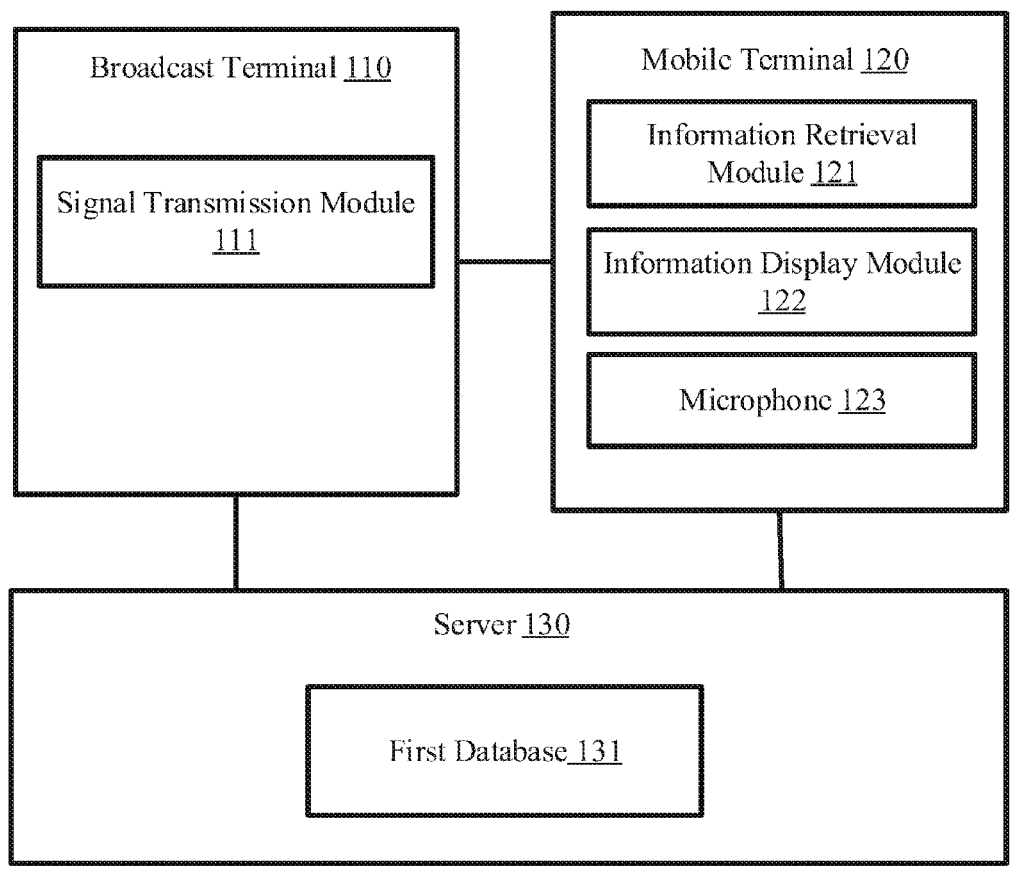
FIG. 1 is a block diagram of a structure of a broadcast service system according to at least one embodiment.

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

It should be understood that specific embodiments described herein are only used to explain at least one embodiment but not used to limit the present invention.

To facilitate understanding of the embodiments of the specification, a few terms are defined as follows.

Calling point: a calling point refers to a location on a trip via public transportation, where a passenger may get on or get off a public transportation vehicle, or transfer to another public transportation vehicle. When a passenger travels via public transportation from one location to another, a trip starts when the passenger gets on a public transportation vehicle at a starting point and ends when the passenger gets off a public transportation vehicle at the destination. A public transportation vehicle may be non-stop from the starting point to the destination, or may have one or more stops en route. A passenger may transfer from one public transportation vehicle to another during a trip. A calling point may be any one of the locations, including a starting point, a destination, a stop en route, and a point where the passenger may transfer to another public transportation vehicle. For example, when a passenger only takes one public transportation vehicle, and there is no stop in between the starting point and the destination, the trip has only two calling points (i.e., one calling point is the starting point and the other calling point is the destination).

Transfer calling point: refers to a calling point where a passenger may transfer from one public transportation vehicle to another. A passenger may transfer between the same type of public transportation (e.g., bus to bus, or train to train), or between different types of public transportation (e.g., bus to ferry, or bus to train). For example, different bus lines may share certain bus stops, and a passenger may get off a bus of a first line and get on another bus of a second line. For example, a bus stop is next to a train station, and a passenger may get off a bus at the bus stop and walks from the bus stop to the platform of the train station to get on a train. In at least one embodiment, when stations/stops of different types of transportation (e.g., a bus stop and a train station) are next to each other, the stations/stops are considered as one calling point, or a transfer calling point. In at least one embodiment, different lines or routes of the same type of transportation (e.g., two different bus lines) may share one station or stop, which is also referred to as a transfer calling point. The term public transportation refers to forms of transportation that are available to the public to ride, which may be run by public entities, such as a government, or by private entities.

Calling point identifier: refers to information for identifying each calling point. The information that identifies calling points may include, but is not limited to, calling point name, calling point code or number, geographic position of the calling point, etc.

Transportation vehicle number: refers to a unique number of a public transportation vehicle for identifying different public transportation vehicles traveling at different times on the same route. For example, a transportation vehicle number may be a bus number, a train number, a flight number, or a voyage number (or trip number) for a bus, a train, a flight, or a ferry or a cruise ship, respectively.

Route information: route information of a public transportation vehicle may include information about a list of calling points on the route of the public transportation vehicle, time schedules at each calling point, and distance and/or average travel time in-between the calling points. For example, route information for a direct train between New York City and Boston downtown may include two calling points, one being the starting point at New York City and the other being the destination at Boston downtown, and distance and/or average travel time of the train between the two calling points. In another example, route information about a local bus at Lower Manhattan may include information about all the bus stops en route, and distance and/or average travel time between either two bus stops.

Time schedule: a time schedule of a calling point refers to schedule information including transportation vehicle numbers and scheduled arrival and departure time of one or more public transportation vehicles that are en route to or from the calling point. For example, the time schedules for Grand Central Terminal, New York City, may include train numbers and/or scheduled arrival and departure time of all trains en route, and bus numbers and arrival and departure time of all buses that is en route to or from nearby bus stops.

FIG. 1 illustrates a block diagram of a structure of a broadcast service system 100 according to at least one embodiment. The broadcast service system 100 includes at least a broadcast terminal 110, which includes at least a signal transmission module 111. The broadcast service system 100 also includes at least a mobile terminal 120, which includes at least an information retrieval module 121, an information display module 122, and a microphone 123. The broadcast service system 100 further includes at least a server 130, which includes at least a first database 131. In other embodiments, broadcast service system 100 may not have all of the elements or features listed and/or may have other elements or features instead of, or in addition to, those listed.

Broadcast service system 100 provides information about public transportation and calling points en route to passengers while travelling via public transportation. In at least one embodiment, broadcast service system 100 may be implemented via one or more broadcast terminals installed on one or more public transit vehicles including, but not limited to, buses, trains, subways, and/or ferries. A broadcast terminal broadcasts messages, optionally via audio frequencies, to at least a mobile terminal of a passenger who travels on the public transportation vehicle within which the broadcast terminal is installed. In this specification the terms audio frequencies or audio sound may be replaced with any audible or inaudible sound signal, such as ultrasound, inaudible low frequency sound, or audible sound signals to obtain other embodiments. Based on the messages received from the broadcast terminal, the mobile terminal obtains information, optionally from a server and/or the broadcast terminal, including route information, information about calling points en route, and/or information about the public transportation vehicle. In at least one embodiment, broadcast service system 100 provides information about a calling point that may be a starting point of a trip, a next calling point en route, a transfer calling point, a destination, and/or any calling point selected by the passenger. In at least one embodiment, broadcast service system 100 predicts the time required to travel to, and/or the time of arrival at, a calling point and may alert the passenger at arrival or in advance of the arrival. Throughout this specification the terms "transportation," "transit," and "transit vehicle" are used interchangeably, and may be substituted one for the other to obtain different embodiments. Throughout this specification the terms "message," "information," and "data" are used interchangeably, and may be substituted one for the other to obtain different embodiments Broadcast terminal 110 is a terminal installed within a public transit vehicle for broadcasting and sending messages to at least a mobile terminal of passengers travelling on the public transportation vehicle. Broadcast terminal 110 maybe a standalone device, or part of public address system for addressing passengers and making announcements. In at least one embodiment, the broadcast terminal 110 communicates, optionally via wireless communications or other communication methods, with at least one mobile terminal and/or at least a server, for transmitting information related to the public transportation and/or calling points en route. The broadcast terminal 110 may include a signal transmission module 111. In at least one other embodiment, the broadcast terminal 110 may not have all of the elements or features listed and/or may have other elements or features instead of, or in addition to, those listed.

Signal transmission module 111 is a module that is configured to transmit signal to at least one mobile terminal. In this specification, the term "module" is to be understood as being generic to software, hardware modules, and combinations of software and hardware modules. In at least one embodiment, the signal transmission module 111 includes hardware such as signal generator, transmitter, speaker, and/or receiver for communicating and transmitting signals. Optionally, signal transmission module 111 may include a microphone, and/or an antenna. In at least one embodiment, the signal transmission module 111 may be part of a public address system and may cause the public address system that sends signals to mobile terminals. Signal transmission module 111 may include algorithms for sending and/or receiving data, optionally via near-field communication (e.g., via audio frequencies). In at least one embodiment, the signal transmission module 111 transmit information related to public transportation vehicle and/or calling points en route including at least a calling point identifier. Optionally, the information is encrypted before sending by the signal transmission module 111, and can be received and decoded by one or more mobile terminals. In at least one embodiment, signal transmission module 111 transmits signals at arrival or before arriving at a calling point (e.g., 30 seconds before arrival), or at a periodic set of times (e.g. every two hours, every five minutes, every 30 seconds, etc.).

In at least one embodiment, signal transmission module 111 uses near field communication methods, e.g., via audio signals. In at least one embodiment, a gamut of audio signals can be used as the carrier for information transfer, including audible frequencies and/or non-audible frequencies. In at least one embodiment, the signal transmission module 111 convert messages into non audible frequencies in the range of 16 Hz-25 Hz or 17000 Hz-22000 Hz. In at least one embodiment, non-audible frequencies may include ultrasonic signals and/or low frequency audio signals. In at least one embodiment, an ultrasonic signal refers to an audio signal with frequency greater than 20000 Hz. In at least one embodiment, a low frequency audio signal is a signal with frequency from 16 to 25 Hz. In at least one embodiment, the non-audible signal transmitted by the signal transmission module 111 is received by a microphone of mobile terminal while passengers on the public transportation vehicle cannot hear the signal.

In at least one embodiment, signal transmission module 111 of broadcast terminal 110 convert, optionally via a signal generator, messages or information into audio signals that are embedded with audio watermarks and/or audio fingerprints. In at least one embodiment, the audio watermark that is embedded in a signal is a unique electronic identifier for identifying ownership and/or an authorized source. In at least one embodiment, to add an audio watermark to an audio signal, a narrow-band signal (used as watermark) is transmitted over a much larger bandwidth (used as the signal sent by broadcast terminal 110) such that the signal energy presented in any signal frequency is very low or undetectable. The watermark is spread over many frequency bands in a signal so that the energy in any one band is undetectable. The audio watermark prevents or at least hampers unauthorized broadcast, rebroadcast, or replay of messages by unauthorized terminals. (In at least one embodiment, the signal transmission module 111 uses low energy (low amplitude) sound wave for embedding the watermark. The sound wave is so low that ears of human cannot pick up the sound wave.) In at least one embodiment, an audio fingerprint that is embedded into an audio signal includes a condensed digital summary of the signal (e.g., a hash of the message) and/or other related information for identifying the audio signal and/or quickly locating the audio signal or other similar or related information in a database.

In at least one embodiment, the signal transmission module 111 embeds at least an audio fingerprint to an audio signal, while a person can hear the acoustic message without being disrupted by the audio fingerprint. In one embodiment, mobile terminal only processes messages with predetermined fingerprints. Audio fingerprints prevent or at least hamper unauthorized broadcasting or rebroadcasting of the messages. In at least one embodiment, signal transmission module 111 may transmit, alone or in any combination, signals via audible audio frequencies, non-audible audio frequencies, signals embedded with audio watermarks, and/or signals embedded with audio fingerprints.

The signal transmission module 111 may be operated or controlled manually by the operator of the public transportation vehicle (e.g., bus driver or captain of a ferry, etc.), and/or by commands received from a server, optionally via a commands receiving module. In at least one embodiment, the signal transmission module 111 may include a speaker for transmitting signals and/or broadcasting messages. The speaker may serve as part of the public address system, or may be a standalone device. In at least one embodiment, the signal transmission module 111 makes use of the public address system of public transportation to transmit signals to mobile terminals.

Mobile terminal 120 is a mobile device used and/or owned by a user for receiving, tracking, managing, alerting, and/or viewing information related to public transportation, routes, calling points, and/or commercial data. Mobile terminal 120 may also have other uses, such as making phone calls, browsing a network, personal computing, and/or receiving messages. For example, the mobile terminal 120 may include smart phones, PDA (Personal Digital Assistant), tablet PCs, laptops, and/or other electronic mobile devices. In at least one embodiment, the mobile terminal 120 includes Apple iPhone, Apple iPod Touch, Apple iPad, Android phones, Android tablet PCs, RIM BlackBerry, Windows Phone, Nokia S60, Symbian phone, and/or other mobile devices capable of running mobile applications.

In at least one embodiment, the mobile terminal 120 is equipped with a communication module (e.g., a network interface) to communicate with a mobile communication network. The mobile communication network includes, but is not limited to, GPRS (General Packet Radio Service) network, WCDMA (Wideband Code Division Multiple Access) network, CDMA2000 (Code Division Multiple Access 2000) network, TD-SCDMA (Time Division-Synchronous Code Division Multiple Access) network, HSDPA (High Speed Downlink Package Access) network, TETRA (Terrestrial Trunked Radio) network, LTE (Long Term Evolution) network, wifi network, WiMAX (Worldwide Interoperability for Microwave Access) network, Bluetooth network and other compatible networks. In at least one embodiment, mobile terminal 120 communicates with at least a server, via at least one of the communication networks mentioned above, and/or accesses to the internet using Internet Protocol (IP). In at least one embodiment, the mobile terminal 120 is equipped with a positioning module to obtain or determine present position and/or speed of the mobile terminal 120.

In at least one embodiment, the broadcast service system 100 includes at least a program running on broadcast terminal 110, mobile terminal 120, and/or a server for implementing the broadcast service system 100. The application on mobile terminal 120 may have the following functions.

1) The application on the mobile terminal provides an interface that allows a user/passenger to input or select, optionally via a user interface on mobile terminal 120, a starting point, a destination of the trip, and/or a transfer calling point. The application further communicates with a server and performs a query to search and display preferred routes (optionally, the passenger may select a route from the routes returned by the server), and optionally display a transfer calling point on the preferred or selected route. If the information received from the server includes route information and a schedule of the public transportation vehicle to which to transfer. The application on mobile terminal 120 further displays the route information, including expected arrival time at the transfer calling point, schedules of the public transportation vehicle for which to transfer at the transfer calling point, expected arrival time at the destination of the trip, etc.

2) The application on mobile terminal 120 allows the user to select, optionally via a user interface, calling points and/or routes that interest the user, and displays information related to the selected calling points and/or routes.

3) The application on mobile terminal 120 includes a text-to-speech function that converts texts or messages related to calling points to audio format so that visually impaired people or people in need can hear the information.

4) The application presents options to the user, which if selected, allows the user to receive information related to calling points when mobile terminal 120 is currently in other uses. Optionally, the application can notify the user of the mobile terminal 120 in forms of alert or message via operating system of the mobile terminal 120. For example, when a passenger is on the phone, browsing a network, or listening to music, the user may select an option that causes the application to receive and display calling point messages as system alerts.

In at least one embodiment, the mobile terminal 120 includes an information retrieval module 121, an information display module 122, and a microphone 123. In other embodiments, the mobile terminal 120 may not have all of the elements or features listed and/or may have other elements or features instead of, or in addition to, those listed.

Information retrieval module 121 is a module that is configured to obtain information about public transportation, information related to a calling point, and/or commercial information. Optionally, the information may be obtained from a server and/or broadcast terminal. 110. The algorithms included in information retrieval module 121 may include the following steps. In step 1, information retrieval module 121 of the mobile terminal 120 receives a request or an indication that the public transportation vehicle is arriving at a calling point. In at least one embodiment, the mobile terminal 120 receives information including at least a calling point identifier from a broadcast terminal 110, when arriving at a calling point or in advance of arrival. In step 2, information retrieval module 121 sends a request to a server for querying information in regards to the calling point identifier, or sends a request to the broadcast terminal 110. In step 3, information retrieval module 121 receives information related to the calling point and other information from the server and/or broadcast terminal 110. Optionally, in step 3, information retrieval module 121 forwards information to an information display module to display. In at least one embodiment, information retrieval module 121 receives messages including information about the public transportation vehicle directly from broadcast terminal 110.

Information display module 122 is a module that is configured to display information obtained by information retrieval module 121. Optionally, information may be displayed in the forms of texts, pictures, videos, and/or audio messages. In at least one embodiment, the information display module 122 displays one or more heading of various information related to a calling point via a user interface, and the passenger may select from the headings to view more detailed information. The algorithms included in the information display module 122 may include the following steps. In step 1, information display module 122 receives information from information retrieval module 121. In step 2, information display module 122 displays headings of information. Optionally of the heading information may include hyperlinks or icons, the user may select via a user interface of an application on mobile terminal 120. For example, in an embodiment, information display module may display via user interface headings such as "weather," "attractions," "stores," "maps," "local services," etc. The passenger may choose by clicking the hyperlink or icon of the headings of information that interest him/her. In step 3, information display module 122 receives the selection, and requests the server or broadcast terminal 110 to send information related to the details that are provided in the heading that was selected. Thereby, the information display module 122 redirects the user to the detailed information in regards to the selected headings. Then, the information display module 122 displays the detailed information associated with the heading that was selected. Optionally, the detailed information associated with each heading may be sent with the original transmission whether or not the user selects any headings. In at least one embodiment, the information display module 122 allows passenger to choose certain categories or headings of information to display automatically when the information is obtained from server and/or broadcast terminal. In at least one embodiment, information display module 122 allows passenger to select and view the information that is most interesting to the passenger. As a result of the selection of the information to view, the display personalized, and/or passenger targeted information is displayed at the mobile terminal 120. In at least one embodiment, information display module 122 displays messages received directly from the broadcast terminal 110, which may include route and number of the public transportation vehicle, time of travel, class of services, and other information, which information may be collected for individual behavior analysis.

Microphone 123 is for receiving audio signals from the broadcast terminal 110 (in addition to being used for carrying on a conversation during a phone call). Microphone 123 may be a mini-microphone to be installed in a mobile device. In an alternative embodiment, microphone 123 may be different than the microphone used during conversations, and may be specialized for the frequencies transmitted by broadcast terminal 110.

Server 130 is a server that stores, manages, tracks, transmits, updates information related to public transportation and calling points. In at least one embodiment, server 130 provides information related to routes and schedules of public transportation, and/or commercial information to mobile terminal 120. In at least one embodiment, server 130 includes a first database 131. In other embodiments, the server 130 may not have all of the elements or features listed and/or may have other elements or features instead of, or in addition to, those listed.

First database 131 is a database that stores information related to public transportation and/or at least some, possibly all, calling points on the routes of public transportation vehicles. The information related to a calling point may include static information, dynamic information, and/or commercial information regarding the calling point. Static information related to a calling point may include, but is not limited to, local maps of the calling point, maps and other information of nearby attractions and points of interest (e.g., hotels, restaurants, retail stores, gas stations, libraries, movie theaters, museums, book stores, hospitals, shopping centers), at least some, possibly all, public transportation that the passenger can transfer to at the calling point, and/or facilities close to the calling point. Dynamic information related to a calling point may include local weather of the calling point, traffic information including time schedules of some or all public transportation at the calling point, and/or seasonal activities, tours, festivals, games and/or shows. Commercial information related to a calling point may include sales and promotional information related to merchandizes and services offers by stores, restaurants, hotels, movie theaters, etc, which are close to the calling point. For example, commercial information related to a calling point may include addresses, summary information, pricing, and pictures. In at least one embodiment, first database 131 also stores route and/or schedules of public transportation en route from or to a calling point, which may be included as part of the information related to the calling point. In at least one embodiment, server 130 updates dynamic and/or commercial information regarding the calling points of public transportation periodically. The updates to the information may be received from external or third party information sources. Optionally, server 130 also updates static information. In at least one embodiment, server 130 may communicate with external or third party information sources to obtain the most up-to-date information to update the first database 131.

Figure 2:
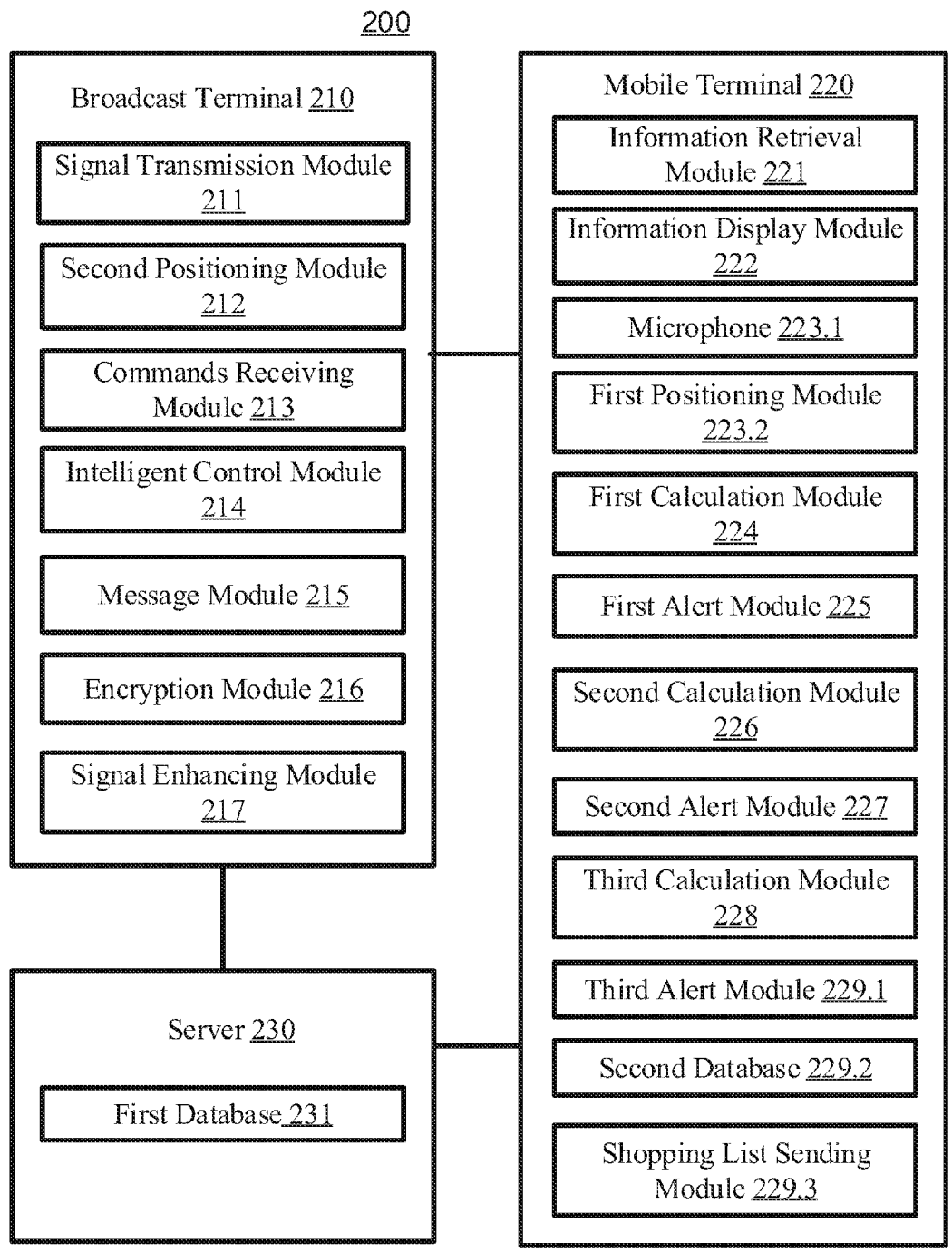
FIG. 2 shows a block diagram of another embodiment of the broadcast service system of FIG. 1.

FIG. 2 shows a block diagram of another embodiment of broadcast service system 200. Broadcast service system 200 includes at least a broadcast terminal 210, which includes at least a signal transmission module 211, a second positioning module 212, a commands receiving module 213, an intelligent control module 214, a message module 215, an encryption module 216, and a signal enhancing module 217. The broadcast service system 200 also includes at least a mobile terminal 220, which includes at least an information retrieval module 221, an information display module 222, a microphone 223.1, a first positioning module 223.2, a first calculation module 224, a first alert module 225, a second calculation module 226, a second alert module 227, a third calculation module 228, a third alert module 229.1, a second database 229.2, and a shopping list sending module 229.3. The broadcast service system 200 further includes at least a server 230, which includes at least a first database 231. In other embodiments, broadcast service system 200 may not have all of the elements or features listed and/or may have other elements or features instead of, or in addition to, those listed.

Broadcast terminal 210, signal transmission module 211, mobile terminal 220, information retrieval module 221, information display module 222, microphone 223.1, server 230, and first database 231 may be embodiments of broadcast terminal 110, signal transmission module 111, mobile terminal 120, information retrieval module 121, information display module 122, microphone 123, server 130, and first database 131, respectively, which were discussed in conjunction with FIG. 1.

Broadcast terminal 210 further includes at least a second positioning module 212, a command receiver module 213, an intelligent control module 214, a message module 215, a message encryption module 216, and a signal enhancing module 217. In other embodiments, broadcast terminal 210 may not have all of the elements or features listed and/or may have other elements or features instead of, or in addition to, those listed.

Second positioning module 212 is a module that is configured to obtain and store present geographic position information of the broadcast terminal 210 and calculate and provide speed information of the public transportation vehicle. The second positioning module 212 may include and/or interact with a Global Positioning System (GPS) chip (or other GPS hardware), and in addition or alternatively may include a base station positioning programs and methods that match the satellite positioning to determine the present position of the broadcast terminal 210. The present geographical position information of the broadcast terminal 210 may include geographical position coordinates information (e.g., longitude, latitude, and altitude). The present geographical position may be recomputed by the broadcast terminal 210 every time that broadcast terminal 210 is repositioned. The position of broadcast terminal 210 may be used to determine when broadcast terminal 210 should send a calling point identifier, by determining how close a mobile terminal is to broadcast terminal 210. In at least one embodiment, the second positioning module 212 may use different algorithms and/or methods to calculate speed of the public transportation vehicle, which may include a present speed and/or an average speed during a predetermined period of time (e.g., during the last 5 minutes, 1 minutes, 30 seconds, etc.). When GPS and base station data is not available or not accurate, the speed and position may be extrapolated based on the last accurate base station and/or GPS data. Alternatively, or additionally, the public transportation vehicle may send data about the speed of the public transportation vehicle to server 130 and/or broadcast terminal 210, which may relay the information to second positioning module 212. Alternatively, or additionally, the signals between broadcast terminal 210 and mobile device 220 may be used for estimating the speed and position of the public transportation vehicle either by using the Doppler effect or by triangulating the signals using multiple broadcast terminal 210. In at least one embodiment, the present geographic position information and speed information are sent to mobile terminal 220 of a passenger on the public transportation vehicle within which the broadcast terminal 210 is installed.

Commands receiving module 213 is a module that is configured to receive and process commands to control and/or operate the broadcast terminal 210. The algorithms included in commands receiving module 213 may include the following steps. In step 1a, the commands receiving module 213 receives commands directly from the operator of a public transportation vehicle or system, including instructions or commands for broadcasting a message, adjusting or enhancing signals, changing the content of the message, etc. For example, the operator of the public transportation vehicle or system may manually alter or input the commands (e.g., by pressing a button, typing in a command via a keypad, via a voice command function). Optionally in step 1b, the commands receiving module 213 receives commands from a server. In step 2, the commands receiving module 213 processes the commands received. For example, commands receiving module may compute when the next alert should be sent to mobile terminal 120 and/or what type of alert should be sent to mobile terminal 120. Optionally in step 3, the commands receiving module 213 sends the commands to the signal transmission module 211, so that the signal transmission module 211 may process the commands received.

Intelligent control module 214 is a module that is configured to automatically broadcast, adjust, and/or change the broadcast message and/or signals, or to control other functions of the broadcast terminal 210. In at least one embodiment, intelligent control module 214 includes algorithms and/or predetermined programs to control the functions of broadcast terminal 210 in regards to different situations. For example, the intelligent control module 214 may cause the signal transmission module 211 of broadcast terminal 210 to automatically broadcast messages related to the public transportation vehicle or system, and/or to automatically send a calling point identifier when arriving at a calling point or in advance of arriving at a calling point. For example, when a direct train has just left New York City Grand Central station and heading to Washington, D.C. Metro Station, the intelligent control module 214 causes the signal transmission module 211 to broadcast a message to inform the passengers that Washington, D.C. is the next calling point (or, destination) and the expected travel time is 3 hours. For example, when the train is still at Manhattan of New York City, no GPS signal may be obtained to inform the passenger of current position or destination. Furthermore, without the GPS signal when the train is still picking up speed a few minutes after leaving Grand Central of NYC, the mobile terminal may not have obtained a current speed, and may not be able to calculate the expected time of arrival, yet, based on the GPS information. In the case when GPS is not able to provide position and/or speed information, the broadcast terminal 210 may broadcast the route information of the train, via the intelligent control module 214, or manually by the operator of the train, or alternatively by commands received from the server. For example, the intelligent control module 214 may automatically cause the broadcast terminal 210 to adjust and/or enhance strength of the signal according to the time of day and/or amount of noise on the broadcast channel according to predetermined settings.

Message module 215 is a module that is configured to generate messages and forward the message to the signal transmission module 211 for transmitting to a mobile terminal 220. The message generated by the message module 215 may include information related to a public transportation vehicle and/or a calling point en route by the transportation vehicle. In at least one embodiment, the message may include relative position of a passenger in relation to the public transportation vehicle when multiple broadcast terminals are installed at different locations on the public transportation vehicle, class of service, transportation vehicle number, etc. For example, message module 215 of a broadcast terminal 210 installed in a train may generate a message including relative position information in the train (e.g., the third car, dining car, etc.), class of service (e.g., sleeper, private room, first class, coach, etc.), and/or the train number. In another example, message generated in a ferry may include deck and section information (e.g., first deck, second deck, room 23, dining room, etc.), class of service, and/or the voyage number. In at least one embodiment, the message may include present geographic and speed of the public transportation vehicle, etc. In at least one embodiment, the message generated by message module 215 may include a calling point identifier and/or other information, optionally at arrival or before arriving at a calling point. The algorithms included in message module 215 may include the following steps. In step 1, the message module 215 generates a message related to the public transportation vehicle and/or a calling point. In step 2, the message module 215 sends the generated message to the signal transmission module 211.

Encryption module 216 is a module that is configured to encrypt messages before sending the messages to mobile terminal 220. In at least one embodiment, the encryption module 216 includes algorithms and methods for encryption, optionally using an encryption key. The encryption key may be received from server 230 or mobile terminal 220. In one embodiment, the encryption key includes a random code that is valid for a limited time. In at least one embodiment, the message encrypted by the encryption module 216 may be decrypted by the mobile terminal 220, optionally using a decryption key that may or may not be the same as the encryption key. In at least one embodiment, the decryption key used by the mobile terminal 220 may be sent by server 230. In at least one embodiment, the encryption of the message by the broadcast terminal 210 before transmission increases security and reliability of the broadcast service system 200, and may prevent problems or errors in the following situations.

For example, a passenger may use mobile terminal 220 or other device (e.g., a recorder) to record a message sent by broadcast terminal 210 at one calling point and replay the message at other locations, or when the public transportation vehicle replays the message that is supposed to be broadcasted at one calling point when the transportation vehicle is at another calling point, mobile terminal 220 may be misled by the replayed message that does not have the correct information for the present calling point.

Also, when an unauthorized terminal or device broadcasts unauthorized messages or alters the information in a recorded message and broadcast the message without being authorized, mobile terminal 220 may be misled by the unauthorized and/or altered message.

Another problem is as follows. When an unauthorized terminal transmits interference signal, the communication between broadcast terminal 210 and mobile terminal 220 may be disrupted or the mobile terminal 220 may not receive the desired signal.

Signal enhancing module 217 is a module that is configured to enhance and/or adjust the signal sent by broadcast terminal 210. Signal enhancing module 217 may include an amplifier, filters for removing noise from the signal, and/or error correction algorithms for correcting errors in the signal. In at least one embodiment, the signal enhancing module 217 includes algorithms for the following functions. In at least one embodiment, the signal enhancing module 217 enhances the strength and amplitude of the signal transmitted by the signal transmission module 211, for protecting the signal from disruption or interference by wired or wireless communication systems (e.g., radio, mobile phones, operating systems of public transportation vehicles, etc.) in places that are crowded by people and/or have various interference sounds or signals, such as on a crowded bus, at a train station, at a pier, or in an outdoor environment. In at least one embodiment, the signal enhancing module 217 adjusts and/or enhances the signal to an extent compatible to the size or scope of the public transportation vehicle or environment that the signal is supposed to be broadcast to. In at least one embodiment, the signal enhancing module 217 enriches the information that is included in the signal. The signal enhancing module 217 increases stability of the broadcast service system 200.

The mobile terminal 220 further includes at least a first positioning module 223.2, a first calculation module 224, a first alert module 225, a second calculation module 226, a second alert module 227, a third calculation module 228, a third alert module 229.1, a second database 229.2, and a shopping list sending module 229.3.

First positioning module 223.2 is a module that is configured to obtain and store present geographic position information of the mobile terminal 220, and/or compute and provide the speed of mobile terminal 220. In at least one embodiment, when the user of the mobile terminal 220 is travelling on a public transportation vehicle, the speed computed by the first positioning module 223.2 may reflect the speed of the public transportation vehicle. The hardware, methods and algorithm for determining present geographic position information and speed information were discussed in conjunction with the second positioning module 212.

First calculation module 224 is a module that is configured to calculate time required to travel to a calling point, and/or predict time of arrival at a calling point, based on present position and speed of the public transportation vehicle received from the first positioning module 223.2 and other information. The algorithms included in the first calculation module 224 may include the following steps. In step 1, the first calculation module 224 receives a request from the user to calculate time required to travel to and/or time of arrival at a calling point (e.g., next calling point, a transfer calling point, destination, etc.). The request may be just the user opening the page of the application that displays the desired time. Alternatively or additionally, the receipt of the information necessary to compute the desired time, may trigger the computation of the desired time. In step 2, the first calculation module 224 receives or retrieves present position and speed information of the public transportation vehicle. In step 3, the first calculation module 224 receives present position and speed information from the first positioning module 223.2. Optionally in step 4, the first calculation module 224 sends a request to server 230 for information about the calling point, including at least the route of the public transportation vehicle and the position of the calling point. In step 5, the first calculation module 224 receives information from server 230. In step 6, the first calculation module 224 calculates the distance on the route of the public transportation vehicle from the present position to the calling point, and divides the distance by the present speed to get the time required to travel to the calling point. Optionally in step 7, the first calculation module 224 adds the time required to travel to the calling point to the current time to get the predicted time of arrival at the calling point. In step 8, the first calculation module 224 sends the calculation results including time required to travel to and/or predicted time of arrival at the calling point to first alert module, and/or to the information display module 222 for displaying on mobile terminal 220.

First alert module 225 is a module that is configured to provide an alert service when the public transportation vehicle arrives at a calling point, or alert the user of the mobile terminal 220 in advance. In at least one embodiment, the first alert module 225 generates a text message, graphic message, or a system alert to display on the mobile terminal 220 or causes mobile terminal 220 to alert the user, via audio messages, alarms, vibrations, or other forms of informing the passenger that the calling point has been reached. In at least one embodiment, the first alert module 225 may alert at every calling point en route, or at calling points selected by the passenger (e.g., a calling point to get off the public transportation vehicle, a calling point to wake up, etc.). In at least one embodiment, the first alert module 225 alerts at a time point in a predetermined time period (e.g., 5 minutes, 1 minute, 30 seconds) before arriving at a calling point, or alerts the user at multiple time points in advance. In at least one embodiment, the first alert module 225 allows a user to select, optionally, via a user interface, the calling points to alert the user, the duration of time in advance of arriving at a destination to alert a user, and/or the mode or format via which to send the alert.

The algorithms included in the first alert module 225 may include the following steps. In step 1a, the first alert module 225 receives a request, via the interface of the mobile terminal 220 to alert a user when arriving at a calling point, and/or to alert the user at a particular time period before arriving at the destination. Optionally in step 1b, the first alert module 225 receives a user selection of the alert mode and/or format. Step 1b need not be performed every time when an alert is set up, but may be performed once at the first time to set up an alert. Alternatively, the first alert module 225 uses a default mode to alert the user. In step 2a, the first alert module 225 receives message from the broadcast terminal 210 that a calling point has arrived. In step 2b, the first alert module 225 alerts the passenger that the calling point has arrived, optionally using the predetermined or default mode and/or format. Alternatively in step 3a, the first alert module 225 receives calculation results from the first calculation module 224, including a predicted time of arrival at and/or time required to travel to the calling point. In step 3b, the first alert module 224 alerts the user when the current time matches the predicted time of arrival. In step 4a, the first alert module 224 calculates the time at which to cause the alert be activated, based on the predicted time of arrival and the predetermined time period to alert before arrival. Alternatively, the time point to alert the user may be calculated based on the time required to travel to the calling point and the predetermined time period to alert the user before arrival. In step 4b, the first alert system 224 alerts the passenger when the current time matches the time determined in step 4a.

Second calculation module 226 is a module that is configured to calculate time required to travel to and/or time of arrival at a calling point, based on present position and speed of the public transportation vehicle received from the second positioning module 212 and other information. The second calculation module 226 has similar algorithms as the first calculation module 224, except that the second calculation module 226 retrieves the present position and speed information of the public transportation vehicle from the second positioning module 212 of the broadcast terminal 210 while the first calculation module 224 receives present position and speed of the public transportation vehicle from the first positioning module 223.2 of mobile terminal 220. Also, calculations of the second calculation module 226 are used by the second alert module 227.

Second alert module 227 is a module that is configured to provide alert services when the public transportation vehicle arrives at a calling point, or in advance. The functions and algorithms of the second alert module 227 is similar to the first alert module 225 except that the second alert module 227 receives calculations results from the second calculation module 226 and determines when to activate an alert based on the time of arrival at, and/or the time required to travel to, a calling point that are calculated by the second calculation module 226, while the first alert module 225 receives and uses calculation results from the first calculation module 224.

Third calculation module 228 is a module that is configured to calculate the time required to travel to, and/or the time of arrival at, a calling point, based on route information and other information received from server 230. The algorithms included in the third calculation module 228 may include the following steps. In step 1, the third calculation module 228 receives a request to calculate the time required to travel to, and/or the time of arrival at, a calling point. In step 2, the third calculation module 228 sends a request to server 230 for route information and/or information related to the calling point, including at least time schedules of public transportation vehicles arriving at and departing from the calling point. Optionally, step 2 may include sending the server information for identifying the public transportation vehicle on which the passenger is travelling on. In step 3, the third calculation module 228 receives information from server 230. In step 4, the third calculation module 228 extracts the time schedules associated with the calling point, and searches for the first upcoming and/or next time of arrival at the calling point relative to the current time. Optionally, current time is determined by the mobile terminal 220. Optionally in step 5, the third calculation module 228 calculates the time difference between the time of arrival on the schedule and current time to obtain the time required to travel to the calling point. In step 6, the third calculation module 228 may store the calculation results in memory so that the calculation results are available to other modules. In step 6, the third calculation module 228 sends the calculation results including the time of arrival at, and/or the time required to travel to, the calling point based on the schedule of public transportation vehicle to third alert module, and/or to the information display module 222 for displaying on mobile terminal 220.

Third alert module 229.1 is a module that is configured to provide alert services when the public transportation vehicle arrives a calling point, and/or alert the user in advance of arriving at the calling point. The functions and algorithms of the third alert module 229.1 is similar to the first alert module 225 except that the third alert module 229.1 uses the calculations results from the third calculation module 228 and determines when to alert the user based on the time schedules received from server 230, while the first alert module 225 receives and/or uses the calculation results from the first calculation module 224 based on present position and speed of the public transportation, which are computed by the first positioning module 223.2.

Second database 229.2 is a database that stores information including at least a shopping list. In at least one embodiment, the mobile terminal 220 includes an application to extract a shopping list from social network accounts of the user, and add to the shopping list to the second database 229.2. In at least one embodiment, the applications of the mobile terminal 220 provides a user with tools for posting a shopping list in the second database 229.2, via social network accounts.

Shopping list sending module 229.3 is a module that is configured to send the shopping list in the second data base 229.2 to server 230, which may be posted on a social network page or sent to a database on the server 230. In at least one embodiment, items on the shopping list sent by the shopping list sending module 229.3 are correlated with, matched with, and/or are related to, commercial information that is stored in the first database 231 of server 230. Optionally, the information in the shopping list may also be stored in first database 231 of server 230 as part of a profile of the user for later use. Server 230 determines whether there are any services, sales, and/or other promotional offers available at a calling point that are pertinent to the shopping list, and then may send information to the user about the services and sales available at a calling point, based on the shopping list. Thus the shopping list allows the server 230 to send personalized and useful commercial information and/or information of calling points close to retail stores or shopping centers to the mobile terminal 220 of passengers. In at least one embodiment, the personalized commercial information may be retrieved by the information retrieval module 221 from server 230 based on the shopping list.

FIGS. 3A, 4A, 5A, 6A, 7A, and 8A are related to FIGS. 3B, 4B, 5B, 6B, 7B, and 8B in that FIGS. 3B, 4B, 5B, 6B, 7B, and 8B show further details of optional embodiments of the methods of FIGS. 3A, 4A, 5A, 6A, 7A, and 8A, respectively. FIGS. 3B, 4B, 5B, 6B, 7B, and 8B also clarify which terminal performs each of the steps of FIGS. 3A, 4A, 5A, 6A, 7A, and 8A, respectively. In FIGS. 3B, 4B, 5B, 6B, 7B, and 8B, the steps are placed on different lines in which each line represents the terminal that performs the indicated step. The collections of steps located on the same line are the steps performed by that terminal and represent a method implemented by that terminal.

Figure 3A:
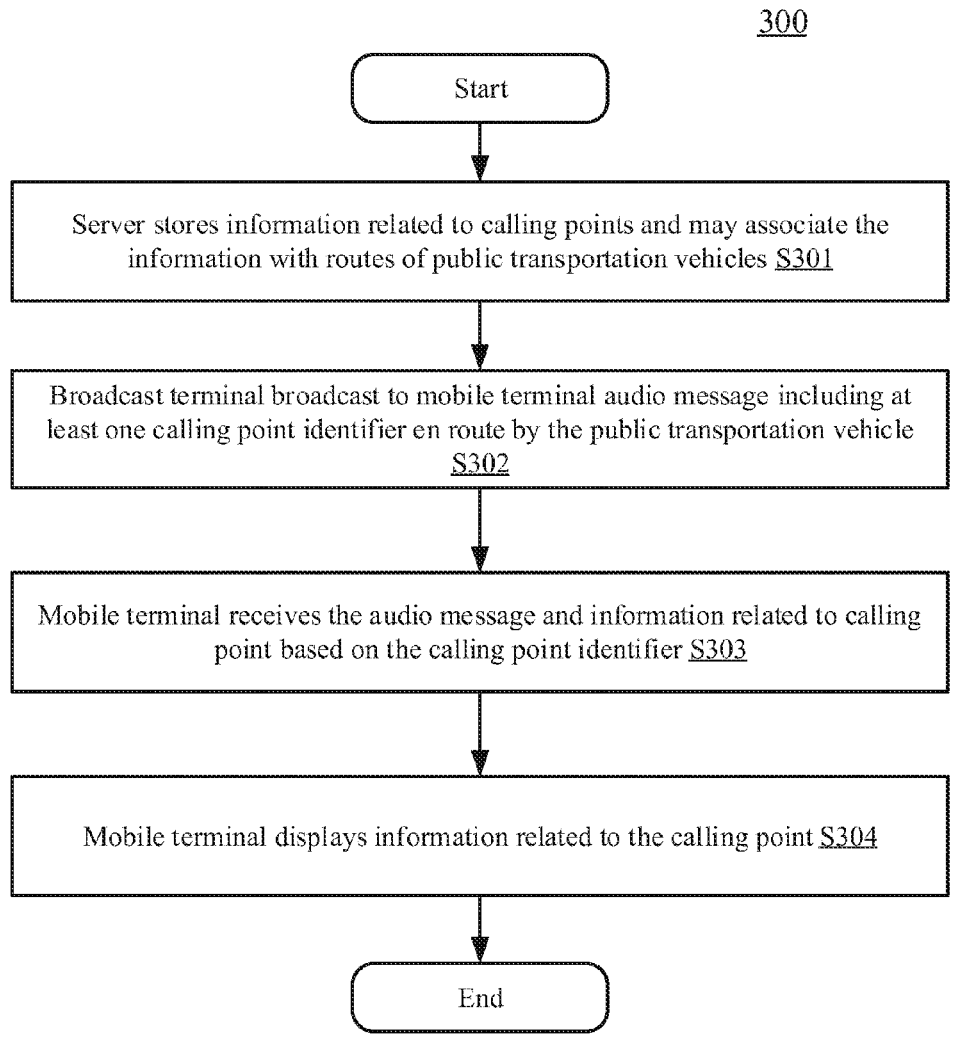
FIGS. 3A and 3B are flowcharts of an embodiment of a method of implementing the broadcast service system.
Figure 3B:
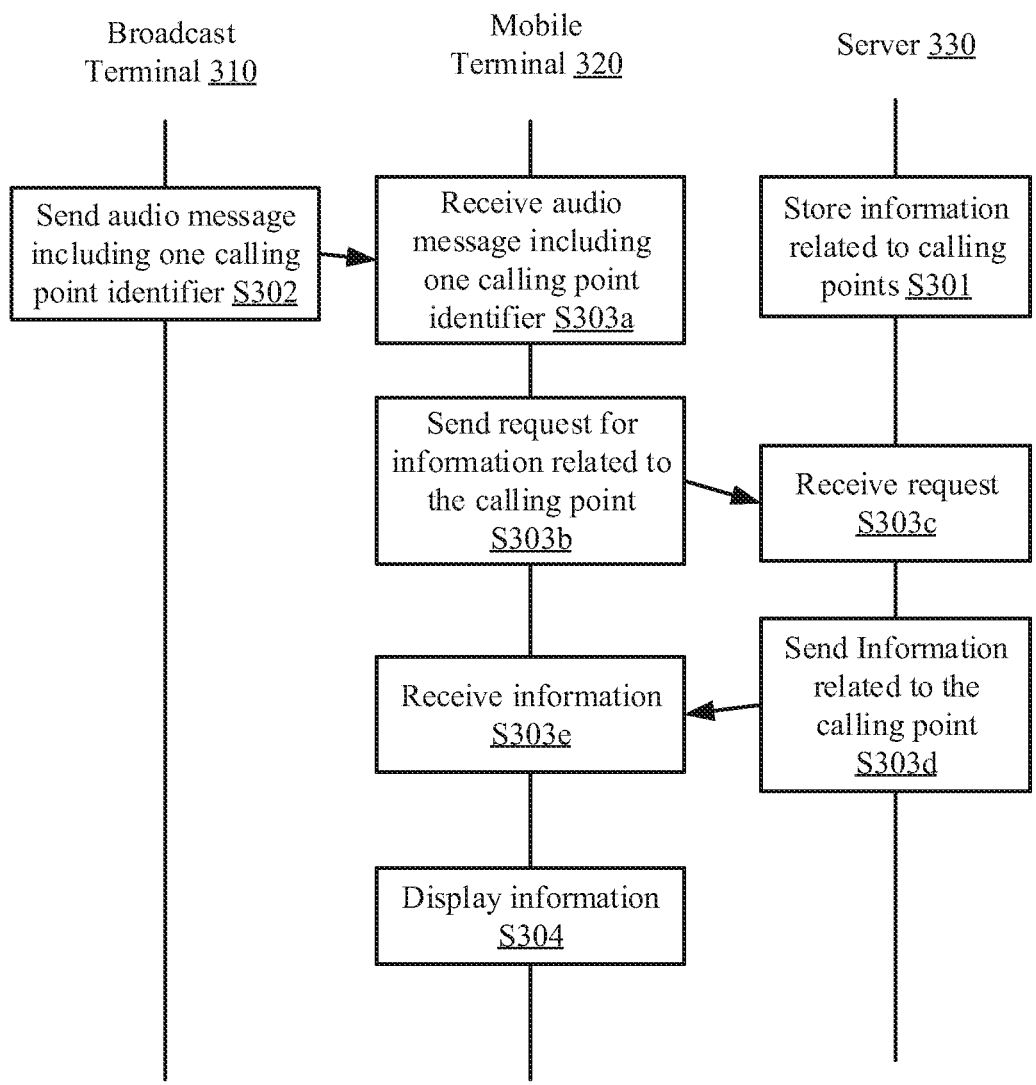

FIGS. 3A and 3B are flowcharts of an embodiment of a method 300 of implementing broadcast service system on public transportation vehicle. Broadcast terminal 310 may be either of the broadcast terminal 110 or 210. Mobile terminal 320 may be either of the mobile terminal 120 or 220. Server 330 may be either of the server 130 or 230.

In step S301, server 330 stores information related to calling points on the route of a public transportation vehicle system, optionally in first database 131 or 231. The information may be include the locations of the calling points, available services associated with the location of each calling point, a schedules of arrivals and departures at the calling point, and/or the schedules of the public transportation vehicles that stop at the calling point.

In step S302, broadcast terminal 310 sends a message to mobile terminal 320, optionally via audio frequencies. The message includes at least a calling point identifier of a calling point that is on the route of a public transportation vehicle. In at least one embodiment, the message is generated by message module 215. The message may be sent by signal transmission module 111 or 211 to mobile terminal 320. Optionally, the message is encrypted by encryption module 216 before sending to mobile terminal 320. In at least one embodiment, the signal transmission is enhanced by signal enhancing module 217.

In step S303, mobile terminal 320 receives the message and query from server 330 information related to the calling point based on the calling point identifier. In sub-step S303*a*, mobile terminal 320 receives the message including the calling point identifier, optionally via microphone 123 or 223.1. In sub-step S303*b*, mobile terminal 320 sends a request and/or the calling point identifier to server 330 for information related to the calling point. In sub-step S303*c*, server 330 receives the request and/or calling point identifier. In sub-step S303*d*, server 330 sends information related to the calling point to mobile terminal 320. In sub-step S303*e*, mobile terminal 320 receives information related to the calling point. Sub-steps S303*b* and S303*e* may be performed by information retrieval module 221.

In step S304, mobile terminal 320 displays the information related to the calling point. In at least one embodiment, step S304 is implemented by information display module 222.

In an embodiment, each of the steps of method 300 is a distinct step. In at least one embodiment, although depicted as distinct steps in FIGS. 3A and 3B, step S301-S304 may not be distinct steps. In other embodiments, method 300 may not have all of the above steps and/or may have other steps in addition to or instead of those listed above. The steps of method 300 may be performed in another order. Subsets of the steps listed above as part of method 300 may be used to form their own method.

Figure 4:
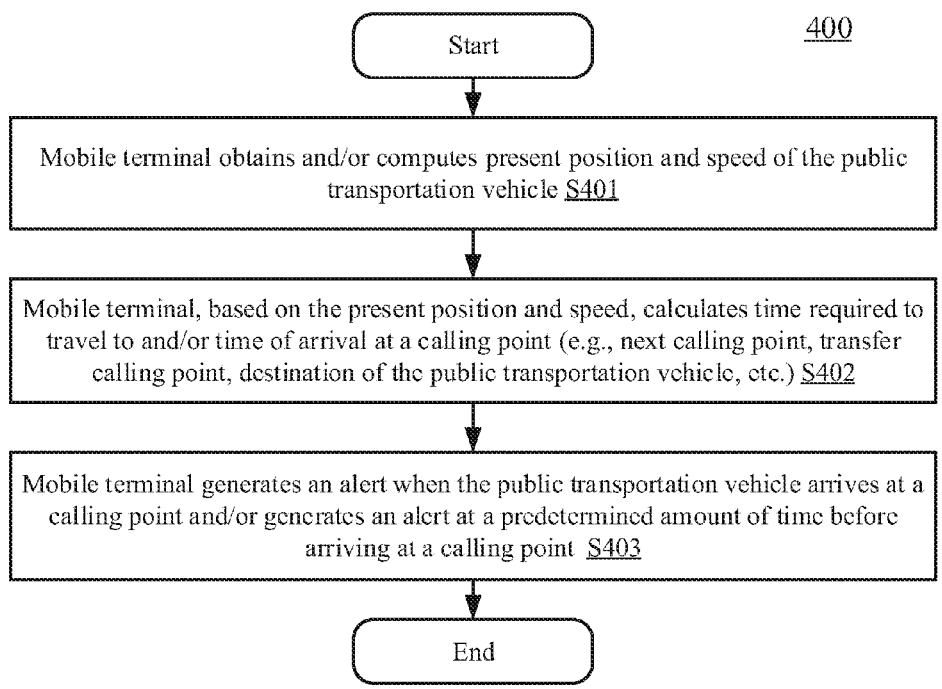
FIG. 4 is a flowchart of an embodiment of a first method of providing an alert at time of arrival at a calling point, or in advance.

FIG. 4 is a flowchart of an embodiment of a first method 400 of providing an alert at time of arrival at a calling point, or in advance. Mobile terminal 420 may be either of the mobile terminal 120 or 220.

In step S401, mobile terminal 420 obtains and/or computes or receives the present position and speed of the public transportation vehicle. If the information is received, the information may be computed and sent by broadcast terminal 310, server 330, and/or the public transportation vehicle. In at least one embodiment, step S401 is implemented by first positioning module 223.2.

In step S402, mobile terminal 420 calculates or retrieves the time required to travel to a calling point (e.g., next calling point, transfer calling point, destination, etc.), based on the present position and speed of the public transportation vehicle. In at least one embodiment, step S402 is implemented by first calculation module 224.

In step S403, mobile terminal 420 sends an alert when the public transportation arrives at the calling point, or sends an alert at a predetermined amount of time before arriving at the calling point. In at least one embodiment, step S403 is implemented by first alert module 225.

In an embodiment, each of the steps of method 400 is a distinct step. In at least one embodiment, although depicted as distinct steps in FIG. 4, step S401-S403 may not be distinct steps. In other embodiments, method 400 may not have all of the above steps and/or may have other steps in addition to or instead of those listed above. The steps of method 400 may be performed in another order. Subsets of the steps listed above as part of method 400 may be used to form their own method.

Figure 5A:
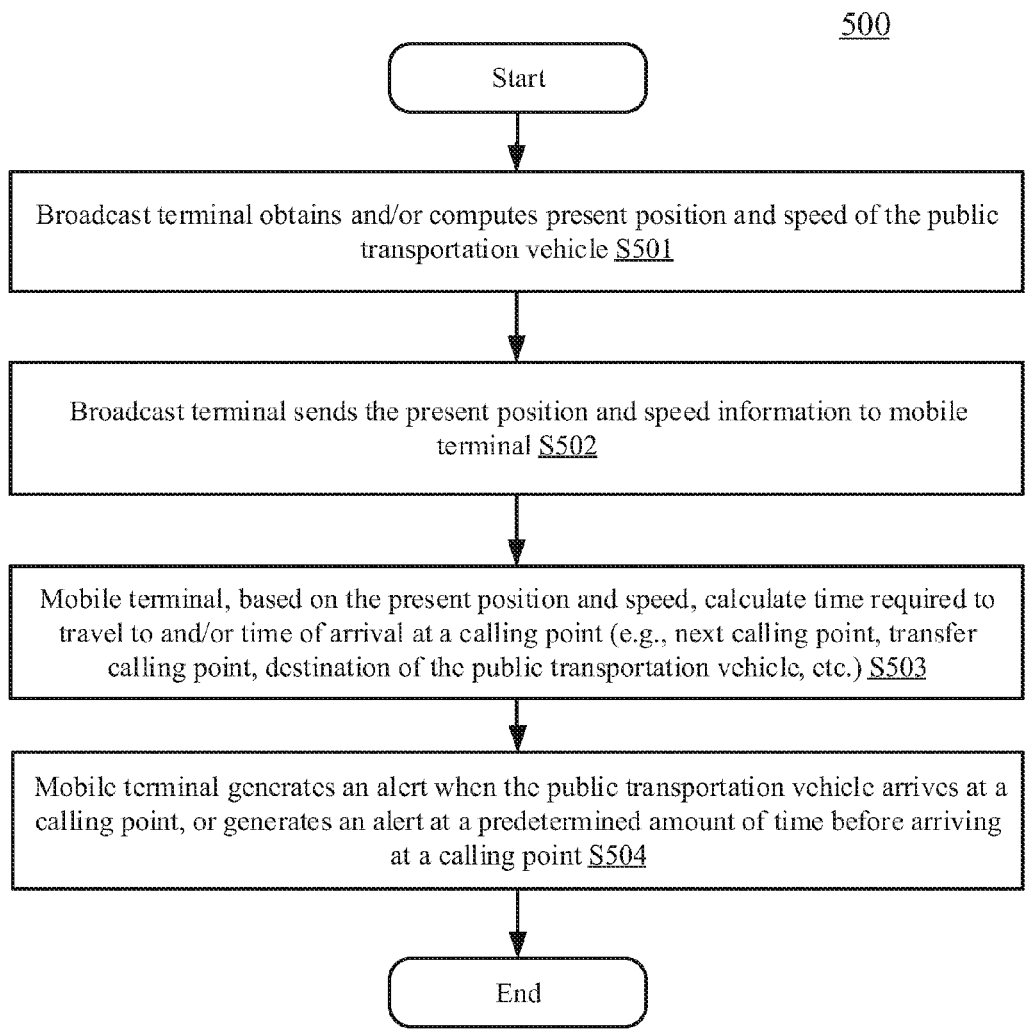
FIGS. 5A and 5B are flowcharts of an embodiment of a second method of providing an alert at time of arrival at a calling point, or in advance.
Figure 5B:
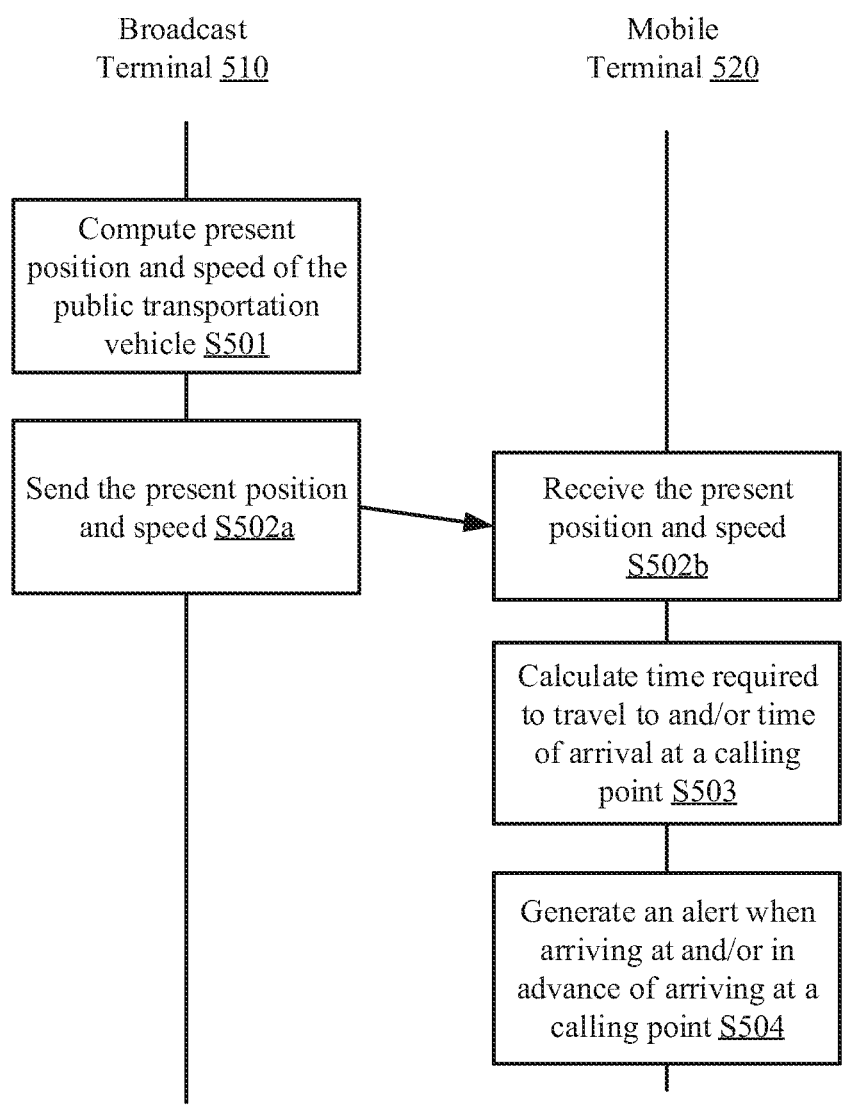

FIGS. 5A and 5B are flowcharts of an embodiment of a second method 500 of providing an alert at time of arrival at a calling point, or in advance. Broadcast terminal 510 may be either of the broadcast terminal 110 or 210. Mobile terminal 520 may be either of the mobile terminal 120 or 220.

In step S501, broadcast terminal 510 obtains and/or computes present position and speed of the public transportation vehicle. In at least one embodiment, step S501 is implemented by second positioning module 212.

In step S502, broadcast terminal 510 sends the present position and speed information to mobile terminal 520, optionally via audio frequencies. In sub-step S502*a*, the broadcast terminal 510 sends the present position and speed information, optionally via signal transmission module 111 or 211. In sub-step S502*b*, mobile terminal receives the present position and speed information, optionally via microphone 123 or 223.1.

In step S503, mobile terminal 520 calculates time required to travel to a calling point based on the present position and speed of the public transportation vehicle received from broadcast terminal 510. In at least one embodiment, step S503 is implemented by second calculation module 226.

In step S504, mobile terminal 520 generates an alert when the public transportation vehicle arrives at the calling point, or alert at a predetermined time before arriving at the calling point. In at least one embodiment, step S504 is implemented by second alert module 227.

In an embodiment, each of the steps of method 500 is a distinct step. In at least one embodiment, although depicted as distinct steps in FIGS. 5A and 5B, step S501-S504 may not be distinct steps. In other embodiments, method 500 may not have all of the above steps and/or may have other steps in addition to or instead of those listed above. The steps of method 500 may be performed in another order. Subsets of the steps listed above as part of method 500 may be used to form their own method.

Figure 6A:
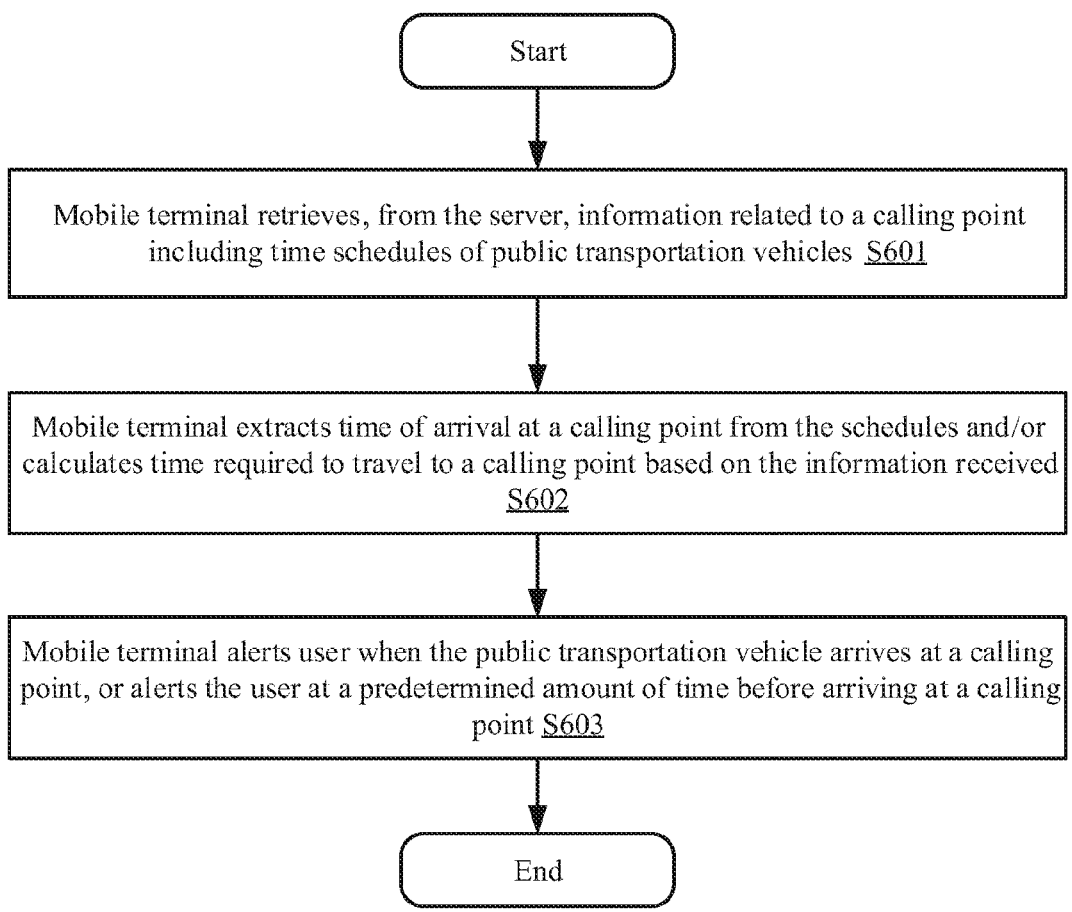
FIGS. 6A and 6B are flowcharts of an embodiment of a third method of providing an alert at time of arrival at a calling point, or in advance.
Figure 6B:
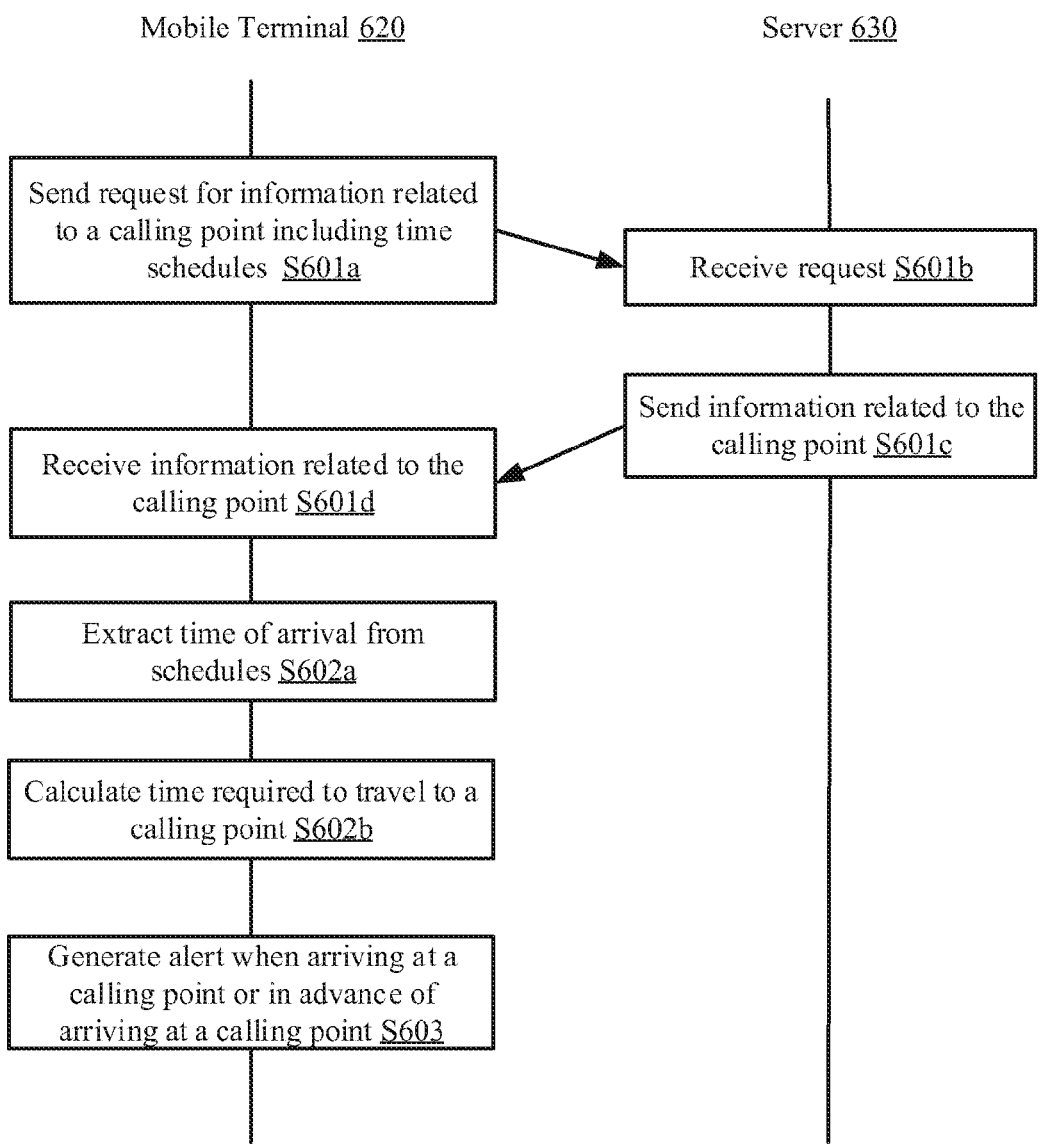

FIGS. 6A and 6B are flowcharts of an embodiment of a third method 600 of providing an alert at the time of arrival at a calling point, or in advance of arriving at a calling point. Mobile terminal 620 may be either of the mobile terminal 120 or 220. Server 630 may be either of the server 130 or 230.

In step S601, mobile terminal 620 retrieves, from server 630, information related to a calling point, including the time schedules of public transportations vehicles. In sub-step S601a, mobile terminal 620 sends a request to server 630 for information related to a calling point. In sub-step S601b, server 630 receives the request. In sub-step S601c, server 630 sends the information related to a calling point including at least time schedules of the public transportation vehicle. In sub-step S601d, mobile terminal 620 receives the information. In at least one embodiment, sub-steps 5601a and S601d are performed by information retrieval module 121 or 221.

In step S602, mobile terminal 620 extracts time of arrival at a calling point from the schedules (sub-step S602a), and/or calculates the time required to travel to a calling point based on the information received from server 630 (sub-step S602b). In at least one embodiment, step S602, sub-steps S602a and S602b are implemented by third calculation module 228.

In step S603, mobile terminal 620 generates an alert when the public transportation vehicle arrives at the calling point, or alert at a predetermined time before arriving at the calling point. In at least one embodiment, step S603 is implemented by third alert module 229.1.

In an embodiment, each of the steps of method 600 is a distinct step. In at least one embodiment, although depicted as distinct steps in FIGS. 6A and 6B, step S601-S603 may not be distinct steps. In other embodiments, method 600 may not have all of the above steps and/or may have other steps in addition to or instead of those listed above. The steps of method 600 may be performed in another order. Subsets of the steps listed above as part of method 600 may be used to form their own method.

Figure 7A:
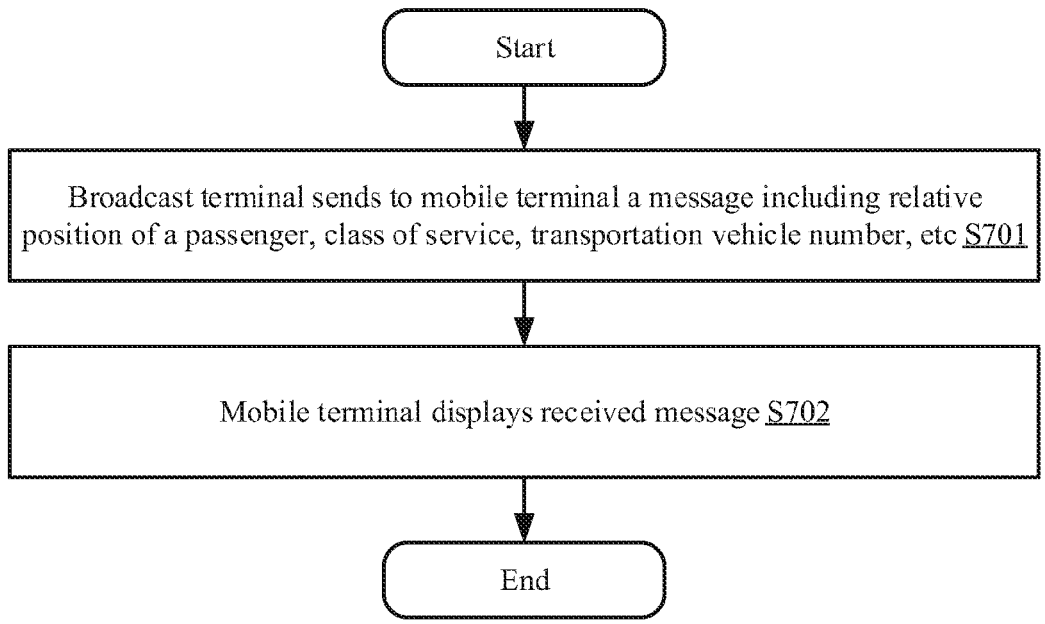
FIGS. 7A and 7B are flowcharts of an embodiment of a method of transmitting information from broadcast terminal to mobile terminal.
Figure 7B:
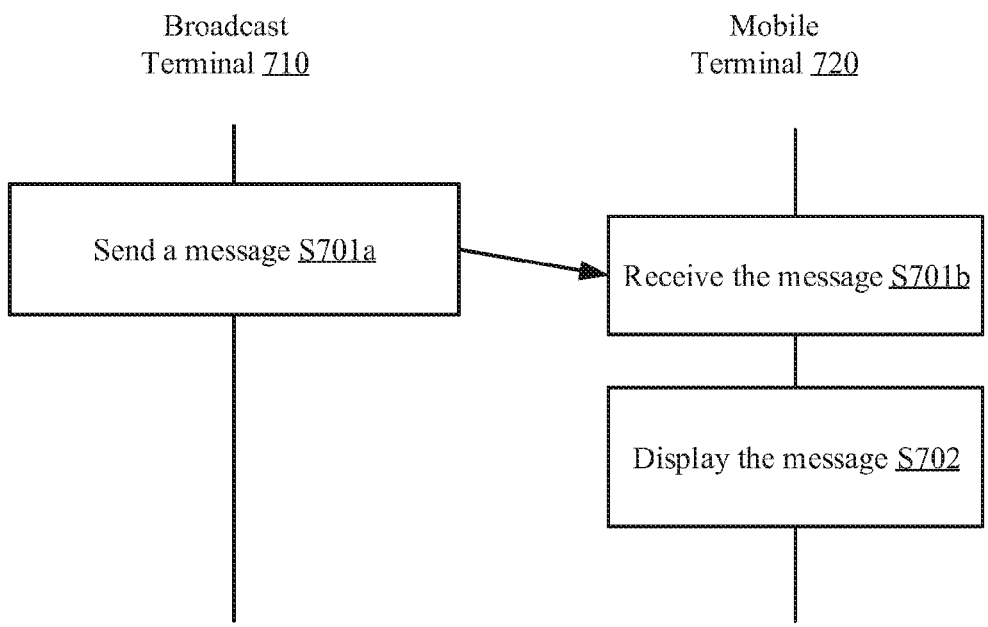

FIGS. 7A and 7B are flowcharts of an embodiment of a method 700 of transmitting a message from broadcast terminal 710 to mobile terminal 720. Broadcast terminal 710 may be either of the broadcast terminal 110 or 210. Mobile terminal 720 may be either of the mobile terminal 120 or 220.

In step S701, broadcast terminal 710 transmits a message to mobile terminal 720, optionally via an audio signal. In at least one embodiment the message is generated by message module 215, and signal transmission module 111 or 211 converts the message to audio signals and transmits the message to mobile terminal 720. The message sent by broadcast terminal 710 was discussed in conjunction with message module 215 of FIG. 2. In sub-step S701a, broadcast terminal 710 sends the message, and in sub-step S701b mobile terminal 720 receives the message.

In step S702, mobile terminal 720 displays the message received from broadcast terminal 510, optionally via information display module 122 or 222.

In an embodiment, each of the steps of method 700 is a distinct step. In at least one embodiment, although depicted as distinct steps in FIGS. 7A and 7B, step S701-S702 may not be distinct steps. In other embodiments, method 700 may not have all of the above steps and/or may have other steps in addition to or instead of those listed above. The steps of method 700 may be performed in another order. Subsets of the steps listed above as part of method 700 may be used to form their own method.

Figure 8A:
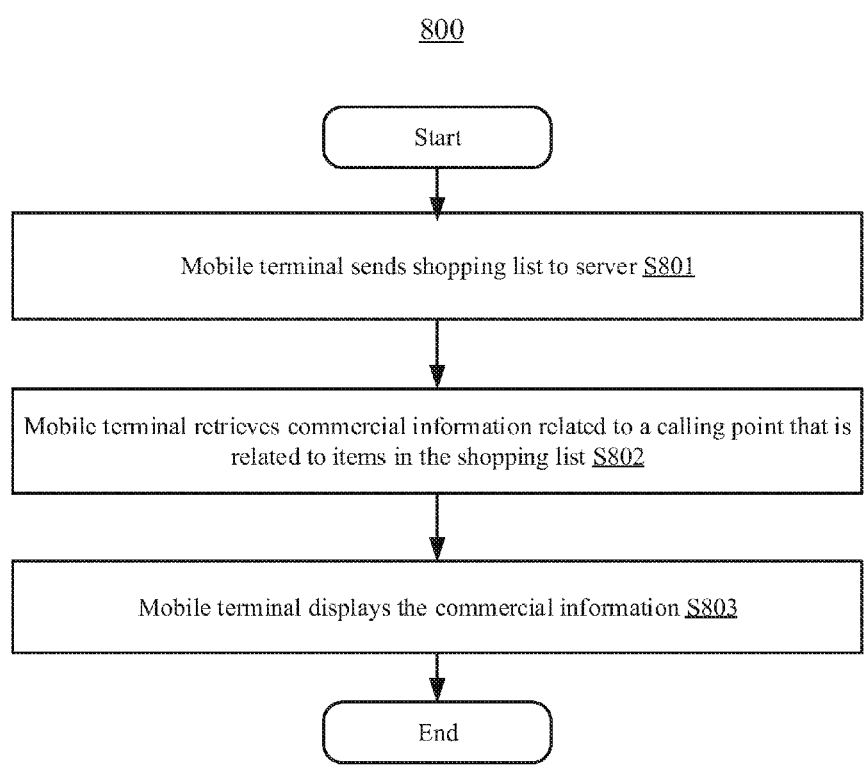
FIGS. 8A and 8B are flowcharts of an embodiment of a method of obtaining commercial information using the broadcast service system.
Figure 8B:
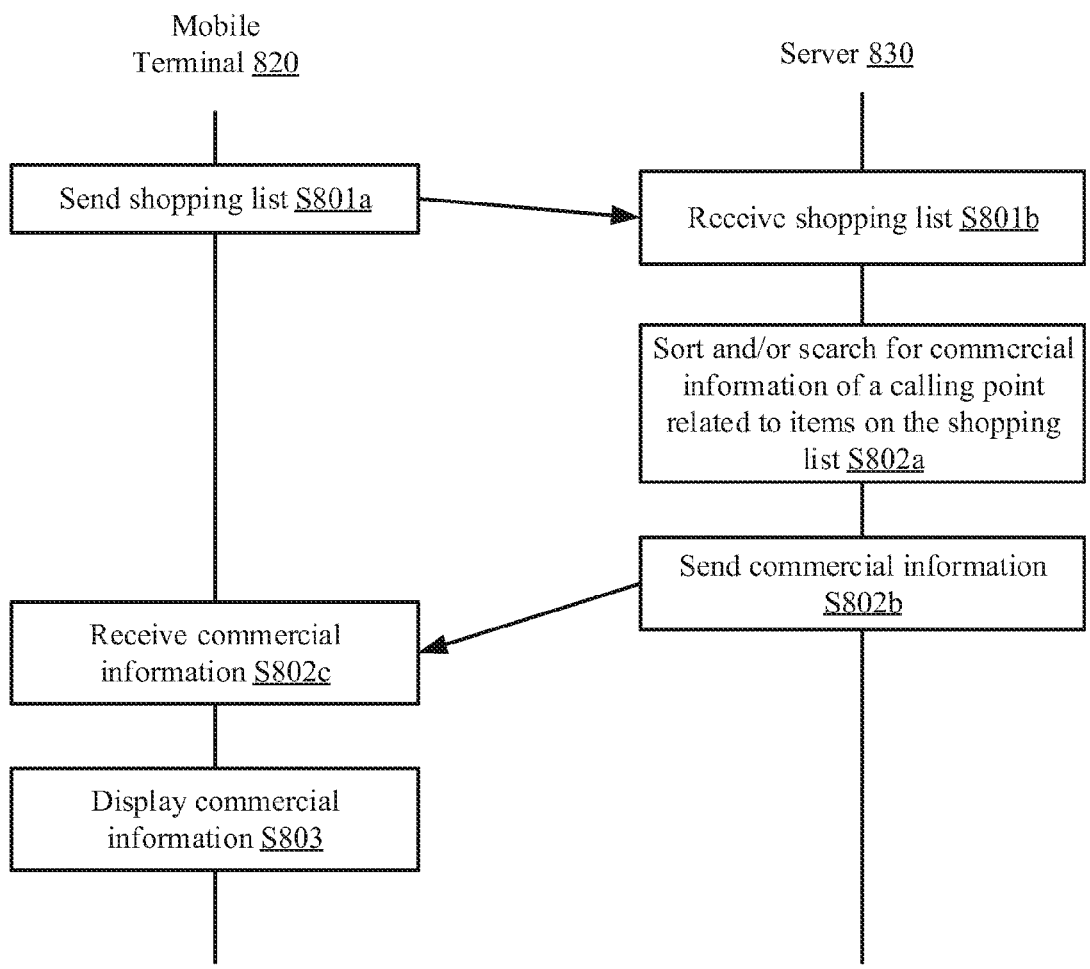

FIGS. 8A and 8B are flowcharts of an embodiment of a method of obtaining commercial information using the broadcast service system. Mobile terminal 820 may be either of the mobile terminal 120 or 220. Server 830 may be either of the server 130 or 230.

In step S801, mobile terminal 820 sends a shopping list to server 830. In sub-step S801a, mobile terminal 820 sends the shopping list, and in sub-step S801b server 830 receives the shopping list. In at least one embodiment, the shopping list is stored in the second database 229.2. In at least one embodiment, sub-step S801a is implemented by shopping list sending module 229.3.

In step S802, mobile terminal 820 retrieves commercial information related to a calling point. The commercial information may match and/or be related to items on the shopping list. In sub-step S802a, server 830 searches for matching or related commercial information in first database 131 or 231, based on items of the shopping list received from mobile terminal 820. For example, server 830 may automatically generate a database query that is processed by a database server associated with first database 131 or 231. In sub-step S802b, server 830 sends matching or related commercial information to mobile terminal 820. In sub-step S802c, mobile terminal 820 receives the commercial information.

In step S803, mobile terminal 820 displays the commercial information that matches or is related to the shopping list, optionally via information display module 122 or 222.

In an embodiment, each of the steps of method 800 is a distinct step. In at least one embodiment, although depicted as distinct steps in FIGS. 8A and 8B, step S801-S803 may not be distinct steps. In other embodiments, method 800 may not have all of the above steps and/or may have other steps in addition to or instead of those listed above. The steps of method 800 may be performed in another order. Subsets of the steps listed above as part of method 800 may be used to form their own method.

One example of implementing the broadcast service system may include the following steps. In step 1, a passenger gets on a bus at a starting point, and uses his/her mobile device to enter the destination of the trip. In step 2, based on the present location or starting point and the destination, the mobile device communicates with a server and computes a route or multiple routes for the passenger to select. Optionally, the mobile terminal obtains information about calling points en route. In step 3, a broadcast terminal installed on the bus broadcasts messages to the mobile device. The message may include an identifier of next calling point prior to expected time of arrival at the next calling point. Optionally the broadcast terminal is manually controlled by the bus operator or another transit personnel, or the broadcast terminal automatically generates broadcasts. In step 4, based on the identifier of next calling point received from broadcast terminal, the mobile device obtains information of next calling point from server. In step 5, the mobile device displays the information about the next calling point that was received from server, and alerts the passenger of the arrival at the next calling point. Optionally in step 6, the mobile device calculates time of arrival at a calling point based on present position and speed of the bus determined by the mobile device or received from the broadcast terminal. In step 7, the mobile device alerts the passenger a first time 30 seconds (or a minute, for example) before arriving at the calling point and a second time as the bus arrives at the calling point.

Figure 9:
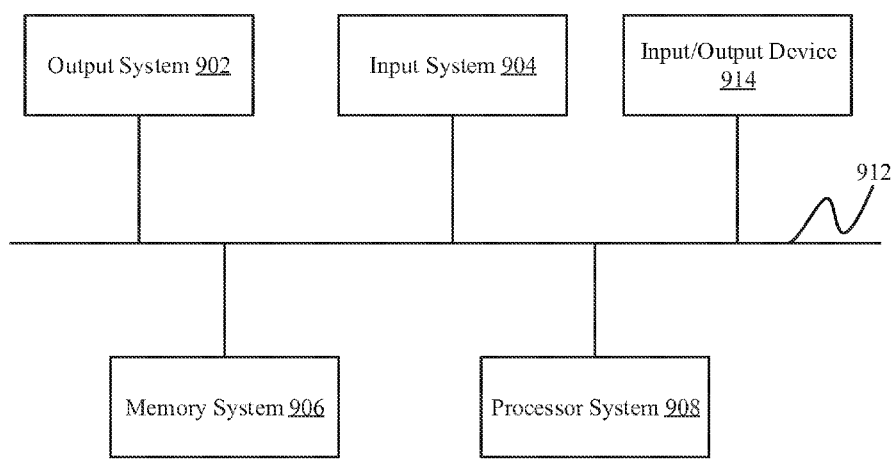
FIG. 9 shows a block diagram of an embodiment of a server in the broadcast service system.

FIG. 9 shows a block diagram of an embodiment of a server 900 in the broadcast service system. Server 900 may be either of server 130 or 230. Server 900 may include an output system 902, an input system 904, a memory system 906, a processor system 908, a communications system 912, and an input/output device 914. In other embodiments, server 900 may include additional components and/or may not include all of the components listed above.

Output system 902 may include any one of, some of, any combination of, or all of a monitor system, a handheld display system, a printer system, a speaker system, a connection or interface system to a sound system, an interface system to peripheral devices and/or a connection and/or interface system to a computer system, intranet, and/or internet, for example. Output system 902 may also include an interface for communicating, via a network (e.g., the Internet) with the broadcast terminal and/or the mobile terminal.

Input system 904 may include any one of, some of, any combination of, or all of a keyboard system, a mouse system, a track ball system, a track pad system, buttons on a handheld system, a scanner system, a microphone system, a connection to a sound system, and/or a connection and/or interface system to a computer system, intranet, and/or internet (e.g., IrDA, USB), for example.

Memory system 906 may include, for example, any one of, some of, any combination of, or all of a long term storage system, such as a hard drive; a short term storage system, such as random access memory; a removable storage system, such as a floppy drive or a removable drive; and/or flash memory. Memory system 906 may include cache memory accessible by a processor. Memory system 906 may include one or more machine-readable mediums that may store a variety of different types of information. The term machine-readable medium is used to refer to any non-transient medium capable carrying information that is readable by a machine. One example of a machine-readable medium is a non-transient computer-readable medium. Another example of a machine-readable medium is paper having holes that are detected that trigger different mechanical, electrical, and/or logic responses. In at least one embodiment, memory system 906 may include software for communicating with the broadcast terminal and/or the mobile terminal, which may include machine instructions for transmitting and receiving information related to calling points and/or commercial information to the mobile terminal and optionally for transmitting information to the broadcast terminal. In at least one embodiment, memory system 906 may include first database 131 or 231, software, which when invoked, implements steps S301, S303 (FIGS. 3A and 3B), S601 (FIGS. 6A and 6B), and S801, S802, (FIGS. 8A and 8B).

Processor system 908 may include any one of, some of, any combination of, or all of multiple parallel processors, a single processor, a system of processors having one or more central processors and/or one or more specialized processors dedicated to specific tasks. In at least one embodiment, processor system 908 may implement machine instructions stored in memory system 906, such as software for storing, managing, tracking, transmitting, updating information related to public transportation and information related to calling points, and communicating with mobile terminal and/or broadcast terminal. In at least one embodiment, processor system 908 may access and manage first database 131 or 231, and implement steps S301, S303 (FIGS. 3A and 3B), S601 (FIGS. 6A and 6B), and S801, S802, (FIGS. 8A and 8B).

Communications system 912 communicatively links output system 902, input system 904, memory system 906, processor system 908, and/or input/output system to each other. Communications system 912 may include any one of, some of, any combination of, or all of electrical cables, fiber optic cables, and/or means of sending signals through air or water (e.g. wireless communications), for example. Some examples of means of sending signals through air and/or water include systems for transmitting electromagnetic waves such as infrared and/or radio waves and/or systems for sending sound waves.

Input/output system 914 may include devices that have the dual function as input and output devices. For example, input/output system 914 may include one or more touch sensitive screens, which display an image and therefore are an output device and accept input when the screens are pressed by a finger or stylus, for example. The touch sensitive screens may be sensitive to heat and/or pressure. One or more of the input/output devices may be sensitive to a voltage or current produced by a stylus, for example. Input/output system 914 is optional, and may be used in addition to or in place of output system 902 and/or input system 904.

Figure 10:
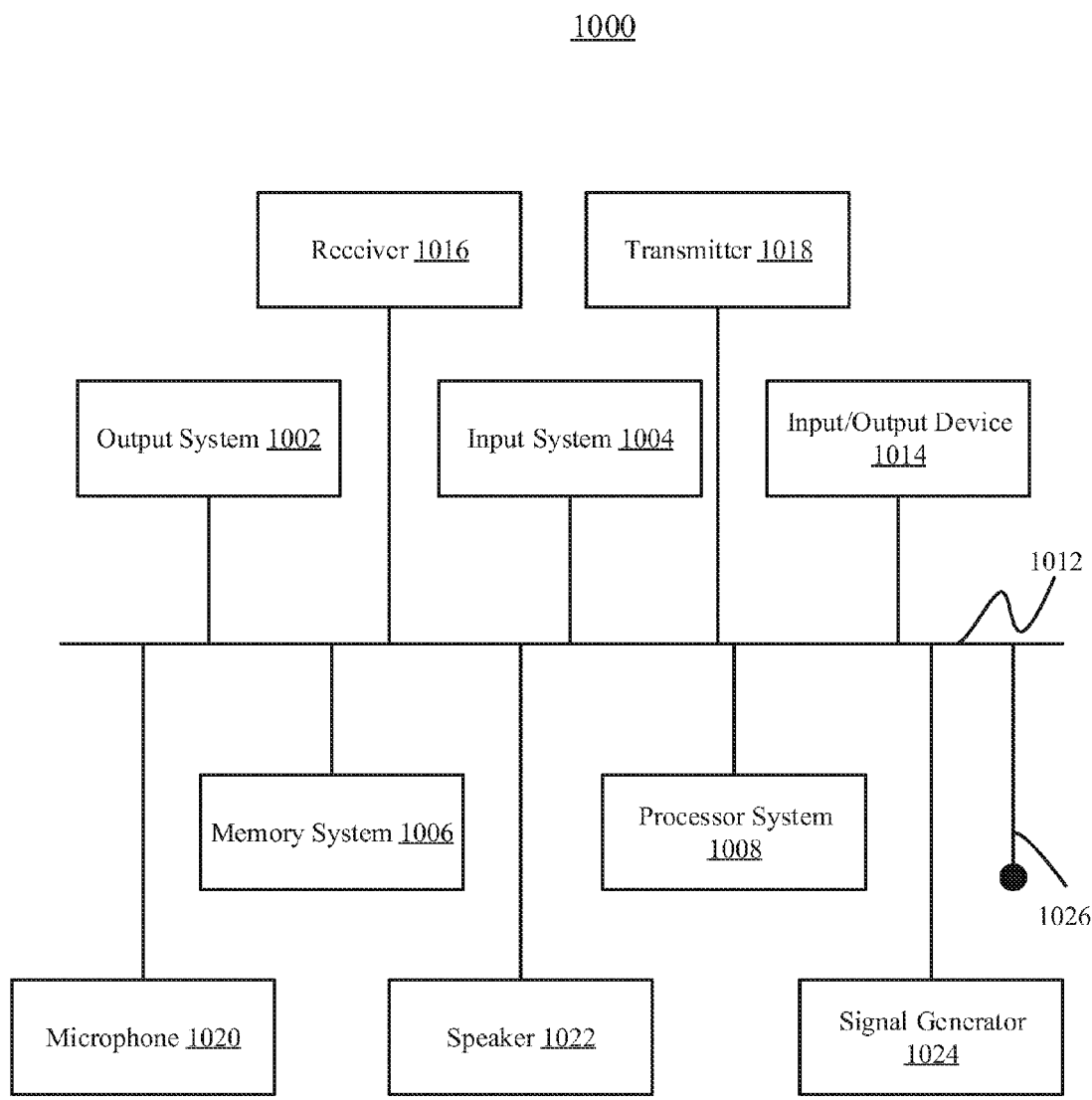
FIG. 10 shows a block diagram of an embodiment of a broadcast terminal in the broadcast service system.

FIG. 10 shows a block diagram of an embodiment of broadcast terminal 1000 in the broadcast service system. Broadcast terminal 1000 may be either of broadcast terminal 110 or 210. Broadcast terminal 1000 may include an output system 1002, an input system 1004, a memory system 1006, a processor system 1008, a communications system 1012, an input/output device 1014, a receiver 1016, a transmitter 1018, a microphone 1020, a speaker 1022, a signal generator 1024, and an antenna 1026. In other embodiments, broadcast terminal 1000 may include additional components and/or may not include all of the components listed above.

Output system 1002, input system 1004, memory system 1006, processor system 1008, communications system 1012, input/output system 1014 were discussed in conjunction with output system 902, input system 904, memory system 906, processor system 908, communications system 912, and input/output system 914 of FIG. 9. However, memory system 1006 of the broadcast terminal 1000 stores signal transmission module 111 or 211, second positioning module 212, commands receiving module 213, intelligent control module 214, message module 215, encryption module 216, and signal enhancing module 217. Memory system 1006 also includes machine instructions for implementing steps S302 (FIGS. 3A and 3B), S501, S502 (FIGS. 5A and 5B), and S701 (FIGS. 7A and 7B). Processor system 1008 of the broadcast terminal 1000 implements the machine instructions for steps S302 (FIGS. 3A and 3B), S501, S502 (FIGS. 5A and 5B), and S701 (FIGS. 7A and 7B).

Receiver 1016 processes the signals received from server and/or mobile terminal. Transmitter 1018 prepares signals for transmission and transmits signals to mobile terminal, and/or server. Optionally microphone 1020 receives audio signals from mobile terminal (which are processed by receiver 1016). Speaker 1022 produces audio signals (based on the signal prepared by transmitter 1018), which may be sent to mobile terminal. In an embodiment, speaker 1022 produces a near field signal. Signal generator 1024 produces signals, which may be converted into electromagnetic signals and/or audio signals. Antenna 1026 may send electromagnetic signals (based on the signal prepared by transmitter 1018) and receive electromagnetic signals (which are processed by receiver 1016). Antenna 1026 is an electromagnetic sensor. Antenna 1026 may have a separate transmitter and receiver than that of transmitter 1018 and receiver 1020.

Figure 11:
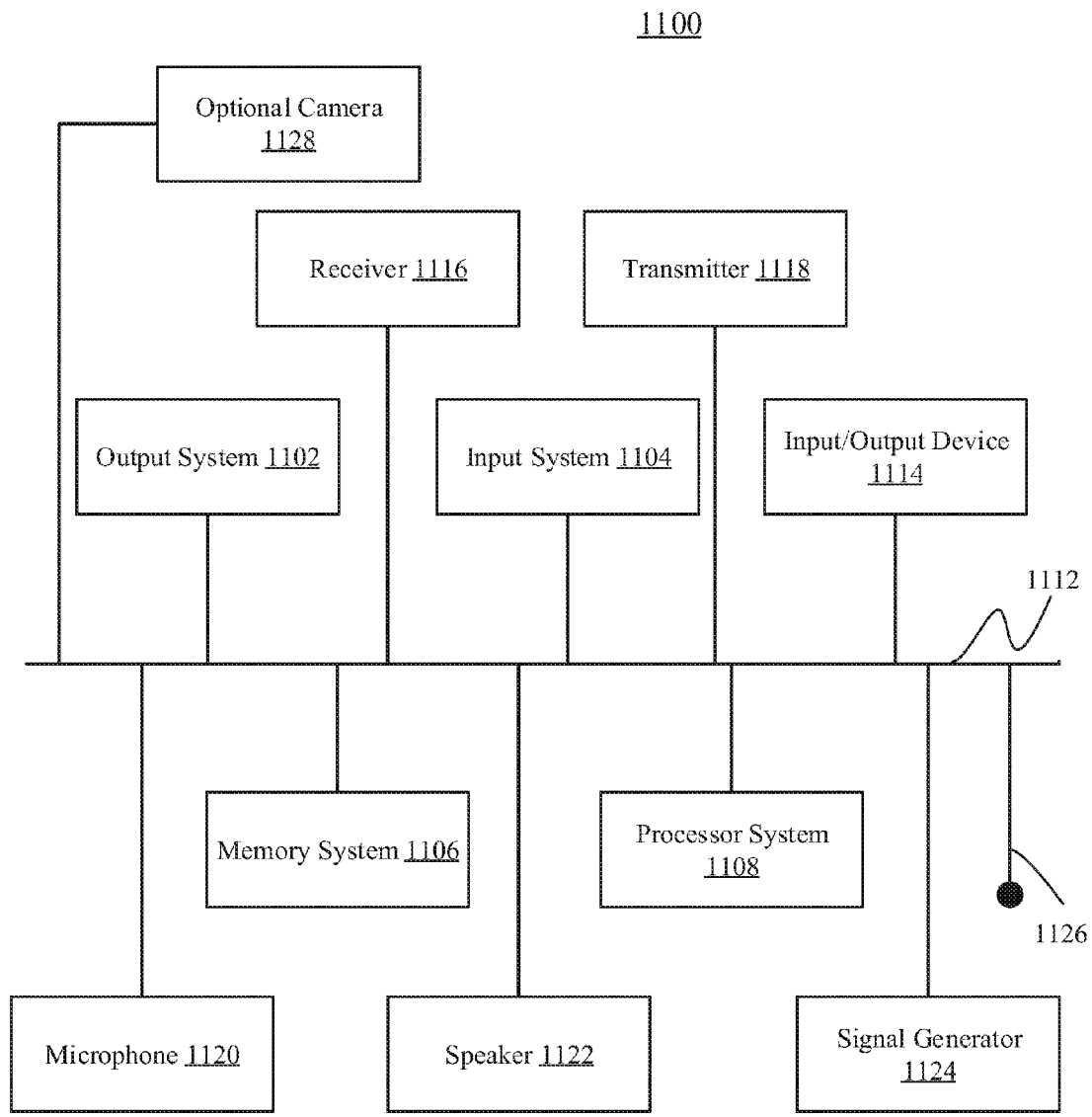
FIG. 11 shows a block diagram of an embodiment of a mobile terminal in the broadcast service system.

FIG. 11 shows a block diagram of an embodiment of mobile terminal 1100 in the broadcast service system. Mobile terminal 1100 may be either of mobile terminal 120 or 220. Mobile terminal 1100 may include an output system 1102, an input system 1104, a memory system 1106, a processor system 1108, a communications system 1112, an input/output system 1114, a receiver 1116, a transmitter 1118, a microphone 1120, a speaker 1122, a signal generator 1124, an antenna 1126, and an optional camera 1128. In other embodiments, mobile terminal 1100 may include additional components and/or may not include all of the components listed above.

Output system 1102, input system 1104, memory system 1106, processor system 1108, communications system 1112, and input/output system 1114 were discussed in conjunction with output system 902, input system 904, memory system 906, processor system 908, communications system 912, and input/output system 914 of FIG. 9.

However, memory system 1106 of mobile terminal 1100 stores information retrieval module 121 or 221, information display module 122 or 222, microphone 123 or 223.1, first positioning module 223.2, first calculation module 224, first alert module 225, second calculation module 226, second alert module 227, third calculation module 228, third alert module 229.1, second database 229.2, and shopping list sending module 229.3. Memory system 1106 also includes machine instructions for method 300 (FIGS. 3A and 3B), 400 (FIG. 4), 500 (FIGS. 5A and 5B), 600 (FIGS. 6A and 6B), 700 (FIGS. 7A and 7B), and 800(FIGS. 8A and 8B). Processor system 1108 of mobile terminal 1100 implements the machine instructions of information retrieval module 121 or 221, information display module 122 or 222, microphone 123 or 223.1, first positioning module 223.2, first calculation module 224, first alert module 225, second calculation module 226, second alert module 227, third calculation module 228, third alert module 229.1, second database 229.2, and shopping list sending module 229.3. Processor system 1108 also implements the machine instructions for method 300 (FIGS. 3A and 3B), 400 (FIG. 4), 500 (FIGS. 5A and 5B), 600 (FIGS. 6A and 6B), 700 (FIGS. 7A and 7B), and 800(FIGS. 8A and 8B). In at least one embodiment, memory system 1106 of mobile terminal 1100 may include a smart card chip capable of storing the instructions mentioned above, such as a SIM card or a Secure Memory Card.

Receiver 1116 processes the signals received from the broadcast terminal, and/or server. Transmitter 1118 prepares signals for transmission to the server, and/or broadcast terminal. Microphone 1120 may be either of microphone 123 or 223.1. Speaker 1122 produces audio signals, which may be sent to the broadcast terminal (in addition to being used for carrying on a conversation during a phone call). Signal generator 1124 produces signals, which may be converted into electromagnetic signals and/or audio signals. Antenna 1126 may send and receive electromagnetic signal. Antenna 1126 may be an electromagnetic sensor. Optional camera 1128 is a camera that may come with the mobile terminal.

Alternative and Extensions

In an embodiment, some calling points are between stops, and inform the user of sites of interest that the user may be able to see while traveling and/or may be interested in for other reasons. For example, there may be a calling point at the halfway point that informs users that the user is halfway between stops. Similarly, if the train routinely needs to make a stop without letting anyone off the train at a certain points that are between regularly scheduled passenger stop, such as to let other traffic pass, there may be a calling point at the stop informing passengers why the stop has occurred.

The information provided at calling points may include information about sites that are not near the calling point, but associated with the calling point for other reasons. The information provided at a calling point may be about locations that are closer to the calling point providing the information about the location than any other calling point even though the location is not particularly close to the calling point. Different embodiments may be obtained by substituting the distances of within 100 yards, 1000 feet, one mile, two miles, 5 miles, or 10 miles for the word "close."

Broadcast service system in at least one embodiment may have other various embodiments, without departure from spirit and essence of the present specification, a person skilled in the art may make various corresponding modifications and variations according to the present specification. However, these modifications and variations should fall within the protective scope of the appended claims of the present specification.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A method, comprising:
sending, from a broadcast terminal to a mobile terminal of a passenger, information including at least an identifier of the broadcast terminal, while the passenger is riding a public transportation vehicle, the broadcast terminal having a processor system including at least one processor, a memory system storing one or more machine instructions on one or more non-transitory computer readable media, and a network interface for communicating with at least the mobile terminal;
wherein the broadcast terminal is installed in a location associated with a stop on a route of the public transportation vehicle;
the information sent is personalized for an intended recipient and is based on the intended recipient's destination, and the information also includes an identifier of the intended recipient and an identifier associated with a stop on a route of the public transportation vehicle;
wherein the broadcast terminal communicates with the mobile terminal via audio signals and the information is sent in the audio signals;
the method also including at least embedding, by the broadcast terminal, a condensed summary of the audio signals sent into the audio signals.

2. A method, comprising:
sending, from a broadcast terminal to a mobile terminal of a passenger, information including at least an identifier of a stop on a route of a public transportation vehicle, while the passenger is riding the public transportation vehicle, the broadcast terminal being installed on the public transportation vehicle, the broadcast terminal having a processor system including at least one processor, a memory system storing one or more machine instructions on one or more non-transitory computer readable media, and a network interface for communicating with at least the mobile terminal;
receiving, at a server from the mobile terminal of the passenger, the identifier of the stop and a request for information related to the stop; and
sending, from the server to the mobile terminal, the information related to the stop;
the information sent from the broadcast device to the mobile terminal is personalized for an intended recipient and is based on
the intended recipient's destination, and includes
an identifier associated with a stop on a route of the public transportation vehicle, and
an identifier of the intended recipient, wherein the broadcast terminal communicates with the mobile terminal via audio signals, and the information is sent in the audio signals;
the method also including at least embedding, by the broadcast terminal, a condensed summary of the audio signals sent into the audio signals.

3. The method of claim 2, wherein
the identifier of the stop includes at least a stop code.

4. The method of claim 2, wherein
the identifier of the stop includes at least stop name.

5. The method of claim 2, wherein
the identifier of the stop includes at least a position of the stop.

6. The method of claim 2, wherein
the sending, from the server to the mobile terminal further includes sending a relative position of the passenger on the public transportation vehicle.

7. The method of claim 2, wherein the sending, from the server to the mobile terminal further includes sending a class of service of the passenger.

8. The method of claim 2, wherein
the sending, from the server to the mobile terminal further includes sending a schedule of the public transportation vehicle.

9. The method of claim 2, wherein
the sending, from the server to the mobile terminal further includes sending a public transportation vehicle number of the public transportation vehicle on which the broadcast terminal is installed.

10. The method of claim 2, further comprising
encrypting the information, by the broadcast terminal, before sending from the broadcast terminal to the mobile terminal, wherein the information further includes a public transportation vehicle number of the public transportation vehicle on which the broadcast terminal is installed.

11. The method of claim 2, further comprising
determining, by the broadcast terminal, a present position of the public transportation vehicle and speed of the public transportation vehicle.

12. The method of claim 2, further comprising
embedding, by the broadcast terminal, at least an audio signal identifying the broadcast terminal into the audio signals, the signal identifying the broadcast terminal being spread over many frequency bands in the audio signals sent by the broadcast terminal.

13. The method of claim 2, further comprising
receiving, at the broadcast terminal from the server, a code, which when invoked changes the sending information that is later sent from the broadcast terminal to the mobile terminal, wherein the sending information is generated by the broadcast terminal.

14. A method, comprising:
storing, at a server, at least information related to a public transportation vehicle; the information related to the transportation vehicle including at least a route and information related to stops on the route of the public transportation vehicle; the server having a processor system including at least one processor, a memory system storing one or more machine instructions on one or more non-transitory computer readable media, and a network interface for communicating with at least a mobile terminal of a passenger;
receiving, at the server from the mobile terminal of the passenger while the passenger is riding the public transportation vehicle, at least an identifier of a stop on the route of the public transportation vehicle and a request for information related to the stop;
sending, directly from the server to the mobile terminal, the information related to the stop;
sending, from a broadcast terminal, located on the public transportation vehicle, to the mobile terminal,
an identifier associated with a stop on a route of the public transportation vehicle
information that is personalized for an intended recipient and is based on the intended recipient's destination, and
an identifier of the intended recipient, wherein the broadcast terminal communicates with the mobile terminal via audio signals and the information is sent by the broadcast terminal is sent in audio signals:
the method also including at least embedding, by the broadcast terminal, a condensed summary of the audio signals sent into the audio signals.

15. The method of claim 14, wherein
the information related to the stop on the route includes at least static information;
wherein the static information includes at least geographic information associated with the stop.

16. The method of claim 14, wherein
the information related to the stop on the route includes at least dynamic information; wherein the dynamic information includes at least information about what is currently occurring at locations associated with the stop.

17. The method of claim 14, wherein
the information related to the stop on the route includes at least commercial information;

wherein the commercial information includes at least information related to commercial establishments associated with the stop.

18. The method of claim 14, further comprising
receiving, at the server from the at least one mobile terminal, a list composed by the passenger using the mobile terminal, the list having items that the passenger is interested in buying;
searching, by the server, a database associated with the server, for commercial information related to at least one of the items on the list; and
sending, from the server, the commercial information to at least the mobile terminal, based on stops that are part of a public transportation system associated with the public transportation vehicle.

19. The method of claim 18, wherein the commercial information includes at least where to find the items on the list at a particular stop.

20. A method, comprising
receiving, at a mobile terminal of a passenger from a broadcast terminal, information including at least an identifier associated with a stop on a route of a public transportation vehicle, the receiving occurring while the passenger is on the public transportation vehicle, the mobile terminal having a processor system including at least one processor, a memory system storing one or more machine instructions on one or more non-transitory computer readable media, and a network interface for communicating with at least the broadcast terminal and a server, wherein the broadcast terminal is installed on the public transportation vehicle;
the information received at the mobile terminal from the broadcast terminal is personalized for an intended recipient includes an identifier associated with a stop on a route of the public transportation vehicle, and is based on
the intended recipient's destination, and
an identifier of the intended recipient, wherein the broadcast terminal communicates with the mobile terminal via audio signals and the information received from the broadcast terminal is received in the audio signals;
the audio signals received having a condensed summary of the audio signals received embedded into the audio signals, by the broadcast terminal; and
sending, from the mobile terminal to the server, the identifier associated with the stop and a request for information related to the stop;
receiving, at the mobile terminal from the server, the information related to the stop; and
displaying, at the mobile terminal, the information related to the stop.

21. The method of claim 20, further comprising
displaying the information received from the broadcast terminal, the information further including a class of service, public transit number, and schedule of the public transportation vehicle.

22. The method of claim 20, further comprising
decrypting, by the mobile terminal, the information received from the broadcast terminal.

23. The method of claim 20, further comprising
determining, by the mobile terminal, a present position of the public transportation vehicle and speed of the public transportation vehicle.

24. The method of claim 23, further comprising
calculating, by the mobile terminal based on the present position of the public transportation vehicle and speed of the public transportation vehicle, a time required to a stop.

25. The method of claim 20, further comprising
receiving, at the mobile terminal from the broadcast terminal, present position of the public transportation vehicle and speed of the public transportation vehicle.

26. The method of claim 25, further comprising
the mobile terminal generating an alert associated with being within a predetermined time of arrival at a stop.

27. The method of claim 20, further comprising
receiving, at the mobile terminal from the server, route information of the public transportation vehicle including at least a time schedule; and
determining, by the mobile terminal based on the time schedule, a time of arrival at a stop.

28. The method of claim 20, further comprising
sending, from the mobile terminal to the server, at least a list having items that the passenger is interested in buying; and
receiving, at the mobile terminal from the server, commercial information related to at least one of the items on the list.

29. The method of claim 20, wherein
the information related to the stop having at least a plurality of categories, each category having a heading, the displaying the information related to the stop further including
displaying, at the mobile terminal, one or more headings of the plurality of categories of the information;
receiving, at the mobile terminal, a selection of at least one of the one or more headings;
displaying, at the mobile terminal, information of the selection of at least one of the one or more headings.

30. A broadcast terminal, comprising:
a processor system having at least one processor,
a network interface,
a memory system storing one or more machine instructions on one or more non-transitory computer readable media; and
wherein the one or more machine instructions, when implemented, cause the processor system of the broadcast terminal to implement a method including at least
sending, from the broadcast terminal to a mobile terminal of a passenger while the passenger is on a public transportation vehicle on which the broadcast terminal is installed, information including at least
an identifier associated with a stop on a route of the public transportation vehicle,
information that is personalized for an intended recipient and is based on the intended recipient's destination, and
an identifier of the intended recipient, wherein the information is sent in audio signals;
wherein the broadcast terminal communicates with the mobile terminal via audio signals;
the method also including at least embedding, by the broadcast terminal, a condensed summary of the audio signals sent into the audio signals.

31. The broadcast terminal of claim 30, wherein
the identifier associated with the stop includes at least a position of the stop.

32. The broadcast terminal of claim 30, wherein
the information further includes relative position of the passenger on the public transportation vehicle, class of service of the passenger, public transit number, and schedule of the public transportation vehicle.

33. The broadcast terminal of claim 30, the method further including
receiving, at the broadcast terminal from a server, a code;
adjusting by the broadcast terminal, when the code is invoked, the information, which is to be sent from the broadcast terminal to the mobile terminal, prior to the information being sent, wherein the information is generated by the broadcast terminal.

34. The broadcast terminal of claim 30, the method further including
encrypting the information by the broadcast terminal, before sending the information from the broadcast terminal to the mobile terminal, wherein the information further includes a public transportation vehicle number of the public transportation vehicle on which the broadcast terminal is installed.

35. The broadcast terminal of claim 30, the method further including
determining, by the broadcast terminal, a present position of the public transportation vehicle and a speed of the public transportation vehicle.

36. The broadcast terminal of claim 35, the method further including
embedding, by the broadcast terminal, at least an audio signal identifying the broadcast terminal into the audio signals, the signal identifying the broadcast terminal being spread out over multiple frequency bands in the audio signals sent by the broadcast terminal, so that the audio signal identifying the broadcast terminal is not detectable without filtering out the audio signals within which the audio signal identifying broadcast terminal is embedded.

37. The broadcast terminal of claim 30, further comprising a microphone and a transmitter that convert the information into an audio signal that is sent to the mobile terminal.

38. The broadcast terminal of claim 37, the method further including
embedding, by the broadcast terminal, at least hash of the audio signal sent into the audio signal.

39. A system comprising a server and a broadcast terminal, the server comprising:
a processor system having at least one processor,
a network interface,
a memory system storing one or more machine instructions on one or more non-transitory computer readable media; and
wherein the one or more machine instructions, when implemented, cause the processor system of the server to implement a method including at least
storing, at the server, at least information related to at least a public transportation vehicle having a route and information related to stops on the route of the public transportation vehicle;
receiving, at the server from a mobile terminal of a passenger while the passenger is riding the public transportation vehicle, at least an identifier of a stop on the route and a request for information related to the stop; and
sending, from the server to the mobile terminal, the information related to the stop;
the system being configured to cause the broadcast terminal send to the mobile terminal
an identifier associated with a stop on a route of the public transportation vehicle,
information that is personalized for an intended recipient and is based on the intended recipient's destination, and
an identifier of the intended recipient, wherein the broadcast terminal is configured to send the information in audio signals;
and the broadcast terminal is configured to communicate with the mobile terminal via audio signals and to embed a condensed summary of the audio signals sent into the audio signals.

40. The server of claim 39, the method further including
sending, from the server to the broadcast terminal, a code, which when invoked causes the broadcast terminal to adjust the information sent from the broadcast terminal to the mobile terminal prior to the information being sent, wherein the information is generated by the broadcast terminal.

41. The server of claim 39, wherein
the information related to the stop includes at least static information, dynamic information, or commercial information; and
wherein the static information includes at least one of local maps of the stop, maps and information of nearby attractions, facilities, and points of interest;
wherein the dynamic information includes at least one of local weather at the stop, traffic information including time schedules of public transits en route to or from the stop, seasonal activities, tours, festivals, games and shows; and
wherein the commercial information includes at least information about an establishment within a predetermined proximity of the stop.

42. The server of claim 39, the method further including
receiving, at the server from the mobile terminal, a list having items that the passenger is interested in buying;
searching, by the server from a database in the server, for commercial information matching or being related to at least one of the items on the list; and
sending, the commercial information from the server to the mobile terminal.

43. A mobile terminal, comprising:
a processor system having at least one processor,
a network interface,
a memory system storing one or more machine instructions on one or more non-transitory computer readable media; and
wherein the one or more machine instructions, when implemented, cause the processor system of the mobile terminal to implement a method including at least
receiving, at the mobile terminal of a passenger on a public transportation vehicle from a broadcast terminal installed on the public transportation vehicle, information including at least an identifier of a stop on a route of the public transportation vehicle, the receiving occurring while the passenger is riding the public transportation vehicle;
sending, from the mobile terminal to a server, the identifier associated with the stop and a request for information related to the stop;
receiving, at the mobile terminal from the server, the information related to the stop; and
displaying, at the mobile terminal, the information related to the stop;
receiving from a broadcast terminal
an identifier associated with a stop on a route of the public transportation vehicle information that is personalized for an intended recipient and is based on the intended recipient's destination, and an identifier of the intended recipient, wherein the communicates received by the mobile terminal from the broadcast terminal are received via audio signals, and the information received is received in the audio signals; the audio signals received from the broadcast terminal having a condensed summary of the audio signals is embedded in the audio signals received, by the broadcast terminal.

44. The mobile terminal of claim 43, the method further including displaying at the mobile terminal the information received from the broadcast terminal, the information further including relative position of the passenger on the public transportation vehicle, a class of service, public transportation vehicle number, and a schedule of the public transportation vehicle.

45. The mobile terminal of claim 43, the method further including decrypting, by the mobile terminal, the information received from the broadcast terminal.

46. The mobile terminal of claim 43, the method further including determining, by the mobile terminal, present position of the public transportation vehicle and speed of the public transportation vehicle.

47. The mobile terminal of claim 46, the method further including calculating, by the mobile terminal based on the present position of the public transportation vehicle and speed of the public transportation vehicle, time required to travel to or time of arrival at the stop.

48. The mobile terminal of claim 43, the method further including receiving, at the mobile terminal from the broadcast terminal, present position of the public transportation vehicle and speed of the public transportation vehicle.

49. The mobile terminal of claim 43, the method further including receiving, at the mobile terminal from the server, route information of the public transportation vehicle including at least a time schedule; and determining, by the mobile terminal based on the time schedule, time required to travel to or time of arrival at a stop.

50. The mobile terminal of claim 49, the method further including generating by the mobile terminal an alert within a predetermined time period of arriving at the stop.

51. The mobile terminal of claim 43, the method further including sending, from the mobile terminal to the server, at least a list having items that the passenger is interested in buying; and receiving, at the mobile terminal from the server, commercial information matching or being related to at least one of the items on the list.

52. The mobile terminal of claim 43, wherein the information related to the stop is in a plurality of categories, each category having a heading, the displaying the information related to the stop further including at least displaying, at the mobile terminal, one or more headings of the one or more categories of the information;

receiving, at the mobile terminal, a selection of at least one of the plurality of headings;

displaying, at the mobile terminal, information of the selection of at least one of the plurality of headings.

* * * * *